(12) United States Patent
Ooga

(10) Patent No.: US 8,730,255 B2
(45) Date of Patent: May 20, 2014

(54) VIDEO SIGNAL PROCESSING CIRCUIT, VIDEO SIGNAL PROCESSING METHOD USED IN SAME, AND IMAGE DISPLAY DEVICE USING SAME

(75) Inventor: Kouichi Ooga, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 275 days.

(21) Appl. No.: 13/366,898

(22) Filed: Feb. 6, 2012

(65) Prior Publication Data

US 2012/0200777 A1 Aug. 9, 2012

(30) Foreign Application Priority Data

Feb. 7, 2011 (JP) ................................. 2011-024387
Dec. 26, 2011 (JP) ................................. 2011-284445

(51) Int. Cl.
*G09G 5/02* (2006.01)
*G09G 5/00* (2006.01)
*G09G 5/10* (2006.01)
*H04N 7/01* (2006.01)
*H04N 11/00* (2006.01)
*H04N 5/222* (2006.01)
*H04N 5/44* (2011.01)
*G06F 7/50* (2006.01)
*H04B 1/7073* (2011.01)
*H04B 1/707* (2011.01)

(52) U.S. Cl.
USPC ........... 345/589; 345/600; 345/606; 345/504; 345/536; 345/690; 348/441; 348/552; 348/723; 348/725; 708/670; 708/672; 375/141; 375/145

(58) Field of Classification Search
USPC ......... 345/589, 600, 605, 606, 616, 501, 504, 345/522, 536–537, 564–565, 572, 690, 691, 345/214; 348/14.12, 441, 467, 469, 474, 348/552, 558, 571, 723, 725; 358/443, 358/447–448; 708/203–204, 670–672; 375/141, 145–147, 149, 219, 295, 316, 375/135–136
See application file for complete search history.

(56) References Cited

U.S. PATENT DOCUMENTS 5,239,672 A * 8/1993 Kurby et al. .................... 455/16
(Continued)

FOREIGN PATENT DOCUMENTS

| JP | 09-244572 A | 9/1997 |
| JP | 2002-258802 A | 9/2002 |
| JP | 2005-156786 A | 6/2005 |

*Primary Examiner* — Wesner Sajous
(74) *Attorney, Agent, or Firm* — Sughrue Mion, PLLC

(57) ABSTRACT

There is provided a video signal processing method for performing predetermined signal processing on an input video signal to transmit an output video signal in a form of a specified transmission format through a video signal line including invalid bit polarity setting processing to be performed by an invalid bit polarity setting unit, wherein, when there exists an invalid bit having no data corresponding to data making up the input video signal in the specified transmission format of the output video signal, to count the number of low and high levels of gray-level data of the input video signal to compare a numerical size between the number of low levels and the number of high levels for judgment and to set a polarity of the invalid bit based on the judgment result.

20 Claims, 15 Drawing Sheets

(56) References Cited

U.S. PATENT DOCUMENTS

| | | | |
|---|---|---|---|
| 5,550,451 A * | 8/1996 | Itoh et al. | 318/811 |
| 5,801,785 A * | 9/1998 | Crump et al. | 348/563 |
| 5,880,719 A * | 3/1999 | Kikinis | 345/212 |
| 2007/0109594 A1 * | 5/2007 | Monroe | 358/1.15 |
| 2008/0158443 A1 * | 7/2008 | Shiomi | 348/790 |
| 2009/0060380 A1 * | 3/2009 | Bujold et al. | 382/275 |
| 2010/0156963 A1 * | 6/2010 | Shiomi | 345/691 |
| 2013/0064269 A1 * | 3/2013 | Jordan | 375/145 |

\* cited by examiner

FIG.6

| D3(±) | D08 | D09 | D18 | D19 | D28 | D29 | X1a | X2a | Number of "1s" |
|---|---|---|---|---|---|---|---|---|---|
| 0  | 0 | 0 | 0 | 0 | 0 | 0 | 0 | 0 | 0 |
| 1  | 0 | 0 | 0 | 0 | 0 | 1 | 0 | 0 | 1 |
| 2  | 0 | 0 | 0 | 0 | 1 | 0 | 0 | 0 | 1 |
| 3  | 0 | 0 | 0 | 0 | 1 | 1 | 0 | 0 | 2 |
| 4  | 0 | 0 | 0 | 1 | 0 | 0 | 0 | 0 | 1 |
| 5  | 0 | 0 | 0 | 1 | 0 | 1 | 0 | 0 | 2 |
| 6  | 0 | 0 | 0 | 1 | 1 | 0 | 0 | 0 | 2 |
| 7  | 0 | 0 | 0 | 1 | 1 | 1 | 0 | 0 | 3 |
| 8  | 0 | 0 | 1 | 0 | 0 | 0 | 0 | 0 | 1 |
| 9  | 0 | 0 | 1 | 0 | 0 | 1 | 0 | 0 | 2 |
| 10 | 0 | 0 | 1 | 0 | 1 | 0 | 0 | 0 | 2 |
| 11 | 0 | 0 | 1 | 0 | 1 | 1 | 0 | 0 | 3 |
| 12 | 0 | 0 | 1 | 1 | 0 | 0 | 0 | 0 | 2 |
| 13 | 0 | 0 | 1 | 1 | 0 | 1 | 0 | 0 | 3 |
| 14 | 0 | 0 | 1 | 1 | 1 | 0 | 0 | 0 | 3 |
| 15 | 0 | 0 | 1 | 1 | 1 | 1 | 1 | 1 | 4 |
| 16 | 0 | 1 | 0 | 0 | 0 | 0 | 0 | 0 | 1 |
| 17 | 0 | 1 | 0 | 0 | 0 | 1 | 0 | 0 | 2 |
| 18 | 0 | 1 | 0 | 0 | 1 | 0 | 0 | 0 | 2 |
| 19 | 0 | 1 | 0 | 0 | 1 | 1 | 0 | 0 | 3 |
| 20 | 0 | 1 | 0 | 1 | 0 | 0 | 0 | 0 | 2 |
| 21 | 0 | 1 | 0 | 1 | 0 | 1 | 0 | 0 | 3 |
| 22 | 0 | 1 | 0 | 1 | 1 | 0 | 0 | 0 | 3 |
| 23 | 0 | 1 | 0 | 1 | 1 | 1 | 1 | 1 | 4 |
| 24 | 0 | 1 | 1 | 0 | 0 | 0 | 0 | 0 | 2 |
| 25 | 0 | 1 | 1 | 0 | 0 | 1 | 0 | 0 | 3 |
| 26 | 0 | 1 | 1 | 0 | 1 | 0 | 0 | 0 | 3 |
| 27 | 0 | 1 | 1 | 0 | 1 | 1 | 1 | 1 | 4 |
| 28 | 0 | 1 | 1 | 1 | 0 | 0 | 0 | 0 | 3 |
| 29 | 0 | 1 | 1 | 1 | 0 | 1 | 1 | 1 | 4 |
| 30 | 0 | 1 | 1 | 1 | 1 | 0 | 1 | 1 | 4 |
| 31 | 0 | 1 | 1 | 1 | 1 | 1 | 0 | 0 | 5 |
| 32 | 1 | 0 | 0 | 0 | 0 | 0 | 0 | 0 | 1 |
| 33 | 1 | 0 | 0 | 0 | 0 | 1 | 0 | 0 | 2 |
| 34 | 1 | 0 | 0 | 0 | 1 | 0 | 0 | 0 | 2 |
| 35 | 1 | 0 | 0 | 0 | 1 | 1 | 0 | 0 | 3 |
| 36 | 1 | 0 | 0 | 1 | 0 | 0 | 0 | 0 | 2 |
| 37 | 1 | 0 | 0 | 1 | 0 | 1 | 0 | 0 | 3 |
| 38 | 1 | 0 | 0 | 1 | 1 | 0 | 0 | 0 | 3 |
| 39 | 1 | 0 | 0 | 1 | 1 | 1 | 1 | 1 | 4 |
| 40 | 1 | 0 | 1 | 0 | 0 | 0 | 0 | 0 | 2 |
| 41 | 1 | 0 | 1 | 0 | 0 | 1 | 0 | 0 | 3 |
| 42 | 1 | 0 | 1 | 0 | 1 | 0 | 0 | 0 | 3 |
| 43 | 1 | 0 | 1 | 0 | 1 | 1 | 1 | 1 | 4 |
| 44 | 1 | 0 | 1 | 1 | 0 | 0 | 0 | 0 | 3 |
| 45 | 1 | 0 | 1 | 1 | 0 | 1 | 1 | 1 | 4 |
| 46 | 1 | 0 | 1 | 1 | 1 | 0 | 1 | 1 | 4 |
| 47 | 1 | 0 | 1 | 1 | 1 | 1 | 0 | 0 | 5 |
| 48 | 1 | 1 | 0 | 0 | 0 | 0 | 0 | 0 | 2 |
| 49 | 1 | 1 | 0 | 0 | 0 | 1 | 0 | 0 | 3 |
| 50 | 1 | 1 | 0 | 0 | 1 | 0 | 0 | 0 | 3 |
| 51 | 1 | 1 | 0 | 0 | 1 | 1 | 1 | 1 | 4 |
| 52 | 1 | 1 | 0 | 1 | 0 | 0 | 0 | 0 | 3 |
| 53 | 1 | 1 | 0 | 1 | 0 | 1 | 1 | 1 | 4 |
| 54 | 1 | 1 | 0 | 1 | 1 | 0 | 1 | 1 | 4 |
| 55 | 1 | 1 | 0 | 1 | 1 | 1 | 0 | 0 | 5 |
| 56 | 1 | 1 | 1 | 0 | 0 | 0 | 0 | 0 | 3 |
| 57 | 1 | 1 | 1 | 0 | 0 | 1 | 1 | 1 | 4 |
| 58 | 1 | 1 | 1 | 0 | 1 | 0 | 1 | 1 | 4 |
| 59 | 1 | 1 | 1 | 0 | 1 | 1 | 0 | 0 | 5 |
| 60 | 1 | 1 | 1 | 1 | 0 | 0 | 1 | 1 | 4 |
| 61 | 1 | 1 | 1 | 1 | 0 | 1 | 0 | 0 | 5 |
| 62 | 1 | 1 | 1 | 1 | 1 | 0 | 0 | 0 | 5 |
| 63 | 1 | 1 | 1 | 1 | 1 | 1 | 1 | 1 | 6 |

Polarity of valid bit on data line D3(±) has 64 patterns in total.

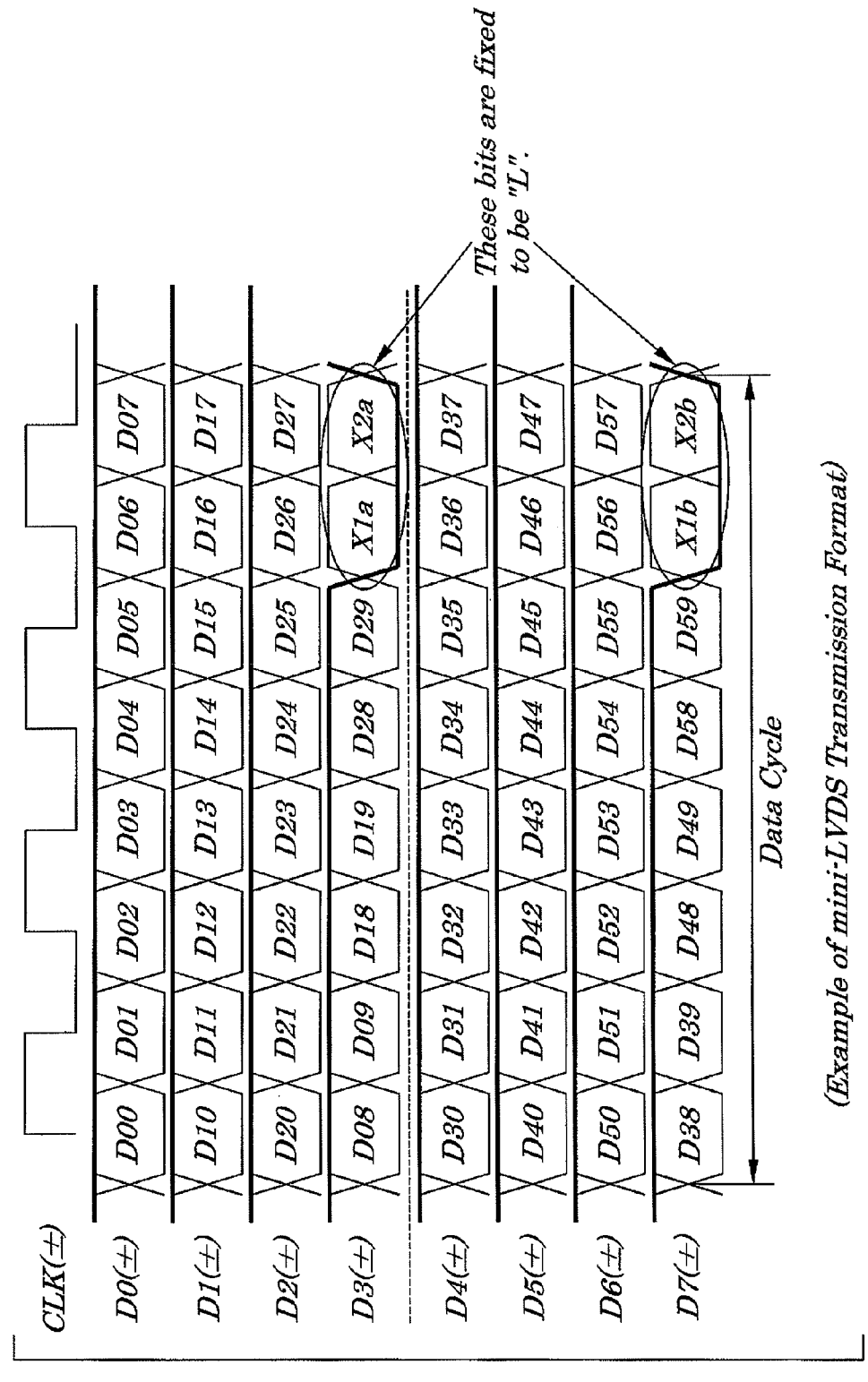

VIDEO SIGNAL PROCESSING CIRCUIT, VIDEO SIGNAL PROCESSING METHOD USED IN SAME, AND IMAGE DISPLAY DEVICE USING SAME

INCORPORATION BY REFERENCE

This application is based upon and claims the benefit of priorities from Japanese Patent Application Nos. 2011-024387, filed on Feb. 7, 2011 and 2011-284445 filed on Dec. 26, 2011, the disclosures of which are incorporated herein in its entirety by reference.

BACKGROUND OF THE INVENTION

1. Field of the Invention

The present invention relates to a video signal processing circuit, a video signal processing method to be used in the video signal processing circuit, and an image display device using the same, which are used in, for example, a liquid crystal display device, plasma display device, or the like, and particularly to the video signal processing circuit being suitably used when there exists an invalid bit having no data corresponding to data making up an input video signal in a transmission format of an output video signal transmitted through a video signal line, and to a video signal processing method applicable to the video signal processing circuit.

2. Description of the Related Art

In a thin-type image display device such as a liquid crystal display device, plasma display device, or the like, as a display panel increases in size and comes to have high resolution (high definition) in recent years, a transmission frequency of a video signal in a device becomes higher. With increased size and high resolution of the display panel, unwanted EMI (Electro Magnetic Interference) emissions become high. Especially, a video signal clock and/or data signal contained in a video signal is transmitted at a comparably high speed and, therefore, EMI peak noises occur. A noise level limit of EMI emissions is regulated for every frequency and it is necessary that all noise levels are maintained within the regulated frequency band. Understandably, the smaller a noise level is, the better performance is. To take the best measure against EMI emissions, it is better that the number of occurring noise per unit time is made smaller.

Noises caused by a video signal clock and/or data signal vary depending upon a frequency component contained in a video signal to be transmitted. A plurality of frequency components contained in a transmission waveform causes an increase in the number of frequency spectra and an increase in the number of times of occurrence of peak noises per unit time causes a possibility that EMI emission levels exceed the regulated value. The frequency component of transmission waveform of a video signal should be minimized as much as possible and, by reducing the number of frequency spectrum being occurred, originally unwanted EMI spectrum is reduced and easy measure against EMI emissions is made possible. Since there is no clear rule for display pattern in assessing EMI emissions, it is desirable that EMI emission levels are low in any display pattern. For example, in the case when there exists an invalid bit having no data corresponding to data making up an input video signal in a transmission format, the number of ports (number of wirings) is necessarily increased due to a trend of high definition and/or an increase in size of a display panel, as a result, portions occupied by invalid bits increase and, therefore, when a polarity of the invalid bit is not controlled, the unwanted peak noise caused by a video signal becomes further large and, to take effective measures again EMI emissions, there is an increasing possibility that the number of shield members and/or number of parts increases. Therefore, an image display device is needed which can lower the EMI emission levels even when an invalid bit exists in a transmission format.

As related art of this type, an image display device disclosed in Patent Reference 1 (Japanese Patent Application Laid-open No. 2002-258802) is proposed. In the image display device, out of 6 bits making up each of necessary image signals MR, MG, and MB representing image data to be read from display memory, a bit other than bits to be used for display of an image with the number of gray level selected in a range less than the maximum number of gray levels are masked according to a gray-level control signal designating the number of the gray-level number. As a result, out of terminals of a display control circuit to output digital image signals OR, OG, and OB to be transmitted to a signal line driving circuit, an output terminal corresponding to the invalid bit, as shown in FIG. 12, is set to low level ("L") or high level ("H") in a fixed manner or is forced to a Hi-z (high impedance) state, in order to reduce power consumption by setting the terminal to "H" or "L" using an external resistance (pull-up resistance or pull-down resistance).

Moreover, a display device disclosed in Patent Reference 2 (Japanese Patent Application laid-open No. 2005-156786) has memory with a width of 32 bits which transmits data by assigning a polarity signal to a reminder of 8 bits being produced when video data containing 8 bits for each of R, G, and B data is stored. This eliminates necessity of increasing data lines simultaneously changing between a control device and memory, thereby reducing the EMI emissions.

Furthermore, a device to display an image disclosed in Patent Reference 3 (Japanese Patent Application Laid-open No. Hei op-2446572), when transmitting white and black gray-level data having a same value for each of the R, G, and B data, for example, transmits only data with R color and does not transmit data with other colors G and B. By forcing a signal line corresponding to G and B color data to a high impedance state, EMI emissions are reduced.

However, the above related technologies have the following problems. That is, in the image display device disclosed in the Patent Reference 1, if an invalid bit is set to "L" or "H" in a fixed manner, in some of gray-level data to be inputted, a change point ("H"→"L" or "L"→"H") occurs in the transmission data. When the transmission data has the change point, a problem occurs that EMI emission noises occur in the corresponding period. For example, as shown in FIG. 13, in the image display device disclosed above, a transmission format of a video signal is transmitted via a mini-LVDS format of, for example, 10 bits, a video signal to be transmitted per one cycle is 10 bits×R (red), G (green), and B (blue) in total (that is, 30 bits) and, therefore, if data is transmitted through a video signal line in 4 pair 8 bit periods, there is a reminder of 2 bits. Ordinarily, a polarity (hereinafter, may be referred to as "logical level") of the reminder bit (that is, invalid bit X1a, X2a, X1b and X2b) is set to "L" level ("0") in a fixed manner to reduce power consumption. However, in the case of the method by which the logical levels of invalid bits X1a, X2a, X1b, and X2b are set in a fixed manner, when, in a predetermined period (that is, in a Data Cycle), a video signal having logical levels being reverse to the logical levels set in a fixed manner is inputted, many EMI peak noises caused by the video signal line occur.

When considered from a viewpoint of EMI emissions, as shown in, for example, in FIG. 14, when a signal having a gray level of 0 ("0000000000") is inputted, since polarities of all bits are same, the EMI peak noise does not occur, however, as shown in FIG. 15, if a signal having a gray level of 1023 ("1111111111") is inputted, since the invalid bits X1a, X2a, X1b, and X2b are set to "L" level in a fixed manner, a change in level occurs before and after the invalid bits X1a, X2a, X1b, and X2b. In this case, there is a problem that, when an image having a gray level of 1023, data 03 (±) and data 07 (±) changes in level in every 4 clock (CLK) period and, as a result, EMI peak noises caused by data occur in ¼ clock period.

In the display device disclosed in the Patent Reference 2, the polarity signal is used as a polarity inverted signal of a liquid crystal and there is no correlation between the polarity of the polarity inverted signal and input gray-level data. For example, if the level of all input gray level data is ("H"), polarity inversion for alternating-current driving of the liquid crystal is required and, if a change in level occurs from "H" to "L" transition at the time of polarity inversion, a change point occurs in transmission data, which presents another problem that EMI noise occurs during the period.

In the device disclosed in the Patent Reference 3, there is also a problem that, even when an invalid bit exists in the transmission format to transmit the above R data, no control is exerted, causing the occurrence of the EMI noises caused by data.

SUMMARY OF THE INVENTION

In view of the above, it is an object of the present invention to provide a video signal processing circuit capable of reducing EMI emissions irrespective of a gray level even when an invalid bit exists in a transmission format of an output video signal, a video signal processing method to be used in the video signal processing circuit, and an image display device using the above circuit and method.

According to a first aspect of the present invention, there is provided a video signal processing circuit for performing predetermined signal processing on an input video signal to transmit an output video signal in a form of a specified transmission format through a video signal line, including:

an invalid bit polarity setting unit, when there exists an invalid bit having no data corresponding to data making up the input video signal in the specified transmission format of the output video signal, to count a number of low and high levels of gray-level data of the input video signal, to compare a numerical size between the number of low levels and the number of high levels for judgment, and to set a polarity of the invalid bit based on a result of the judgment.

According to a second aspect of the present invention, there is provided a video signal processing method for performing predetermined signal processing on an input video signal to transmit an output video signal in a form of a specified transmission format through a video signal line including:

invalid bit polarity setting processing to be performed by an invalid bit polarity setting unit, wherein, when there exists an invalid bit having no data corresponding to data making up the input video signal in the specified transmission format of the output video signal, to count a number of low and high levels of gray-level data of the input video signal, to compare a numerical size between the number of low levels and the number of high levels for judgment, and to set a polarity of the invalid bit based on a result of the judgment.

With the above configuration of the present Invention, even when an invalid bit exists in a transmission format of an output video signal, irrespective of a gray level, EMI emission levels can be lowered.

BRIEF DESCRIPTION OF THE DRAWINGS

The above and other objects, advantages, and features of the present invention will be more apparent from the following description taken in conjunction with the accompanying drawings in which:

FIG. 6 is a diagram showing the number of valid bit "1" and the polarities of invalid bits at the time;

FIG. 15 is a diagram showing signal arrangement in the mini-LVDS format in which a signal having a gray level of 1023 inputted, which is described in the Related Arts.

DETAILED DESCRIPTION OF THE PREFERRED EMBODIMENTS

Figure 1:
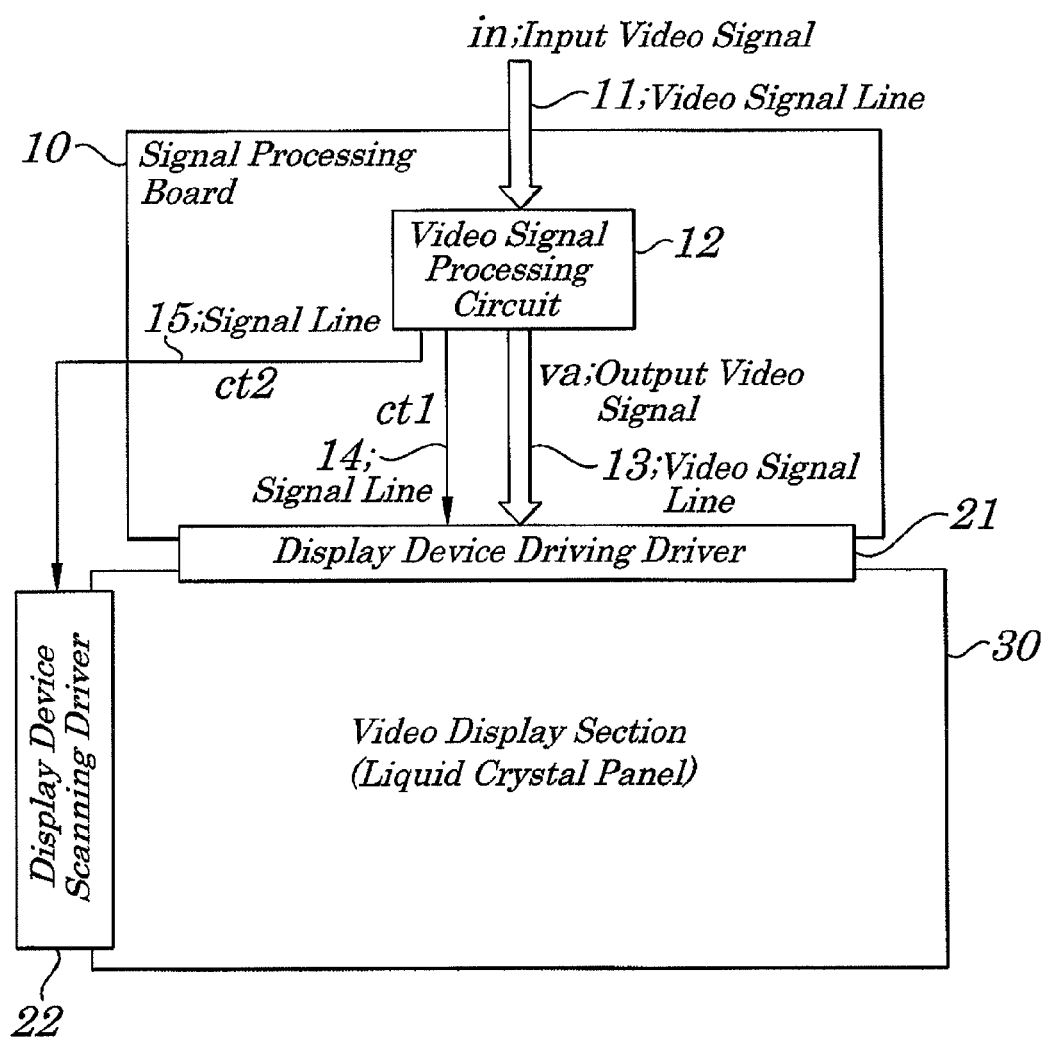
FIG. 1 is a block diagram showing electric configurations of main portions of an image display device having a video signal processing circuit according to a first exemplary embodiment of the present invention.

Best modes of carrying out the present invention will be described in further detail using various embodiments with reference to the accompanying drawings.

A video signal processing circuit has an invalid bit polarity setting means made up of an input video signal judging section to count the number of low levels and the number of high levels of gray level data (binary number) contained in an input video signal and to compare the numerical size between the number of the low levels and the number of high levels to output a judgment result and of an invalid bit polarity determining means (invalid bit control section) to determine a polarity of an invalid bit based on the judgment result provided by the input video signal judging section.

The input video signal judging means is so configured as to count the number of low and high levels of gray-level data of the input video signal existing within a period corresponding to a predetermined period in the output video signal in which the invalid bit exists and the invalid bit determining means, when the number of high levels is more than half of the total number, determines the polarity of the invalid bit to be high level and, when the number of low levels is more than half of the total number, determines the polarity of the invalid bit to be low level. However, the invalid bit determining means, when the number of low levels is the same as that of the high levels, determines the polarity of the invalid bit to be low level.

The video signal processing circuit is provided which is so configured as to perform predetermined signal processing on an input vide signal and to transmit an output video signal in a form of a specified transmission format, through a video signal line and is so configured to have an invalid polarity setting means, in which, when an invalid bit having no data corresponding to data making up the input video signal in the transmission format of the output video signal exists, the polarity of the invalid bit is set to be the same as that of one valid bit before the valid bit data in terms of time series for output video signal in which the invalid bit exists.

The video signal processing circuit is provided which is configured as a master-side device configured to perform predetermined signal processing on an output video signal in the form of a specified transmission format and to transmit the processed output video signal through a device signal line and to which a slave-side device having a plurality of data storing devices and an address is connected through the video signal line and which outputs the address and a transmitting/receiving demand signal to the slave-side device and, further, transmits the output video signal or receives data from the slave-side device and outputs device selection bit data for selection of each of the data storing devices mounted on the slave-side device at the time of transmission mode, and is configured to have an invalid bit polarity setting means to count the number of low and high levels of data received from the slave-side device in a predetermined period and compares the numerical size between the number of low and high levels for polarity judgment and, based on the judgment result and sets the polarity of the device selection bit data which becomes invalid at the time of receiving mode in which each of the data storing devices of the slave-side devices is not selected.

The invalid bit polarity setting means is made up of a transmission mode judging means (transmission mode judging circuit) to judge, based on the transmitting/receiving demand signal, whether the video signal processing circuit is in the transmission mode or in the receiving mode in a predetermined period, a counting means (counter circuit) to count, in a predetermined period, the number of high and low levels of the data received from the slave-side device when the transmission mode is the receiving mode, and an invalid bit polarity determining means (invalid bit control section) to compare the numerical size between the number of low and high levels of the data counted by the counting means for polarity judgment in a predetermined period and to determine the polarity of the invalid bit based on the judgment result.

The invalid bit polarity determining means (invalid bit control section) is configured to determine the polarity of the invalid bit to be high level when the number of high levels is more than half of the total number and to determine the polarity of the invalid bit to be low level when the number of low levels is more than half of the total number. The invalid bit polarity determining means (invalid bit control section), when the number of high levels is the same as that of the number of low levels, to determine the polarity of the invalid bit to be low level.

The video signal processing circuit is provided which is so configured as to perform predetermined signal processing on an output video signal in the form of specified transmission format and to transmit the processed output video signal through a video signal line to which a slave-side device having a plurality of data storing devices and an address is connected through the video signal line and which is configured as a master-side device to output the address and a signal demanding transmitting/receiving operations, in every determined period, to the slave-side device to transmit the output signal or to receive data from the slave-side device and to output device selection bit data for selection of each of the data storing devices mounted on the slave-side device at the time of transmitting mode and to be provided with an invalid bit setting means to set the polarity of the device selection bit data which becomes invalid data at the time of receiving mode during which each of the data storing devices of the slave-side device is not selected to be the same as that of one valid data bit before valid data bit in terms of time series.

First Embodiment

FIG. 1 is a block diagram showing electrical configurations of main portions of an image display device having a video signal processing circuit of the first exemplary embodiment of the present invention.

The image display device of the embodiment includes, as shown in FIG. 1, a signal processing board 10, a display device driving driver 21, a display device scanning driver 22, and a video display section 30. The signal processing board 10 has a video signal line 11, a video signal processing circuit 12, a video signal line 13, and signal lines 14 and 15. In the video signal processing circuit 12, specified signal processing (for example, rearrangement processing of video signals) is performed on an input video signal "in" inputted through the video signal line 11 from outside and an output video signal "va" is transmitted, in a form of a transmission format predetermined in a manner to correspond to the display device driving driver 21, through the video signal line 13 to the display device scanning driver 22. In the video signal processing circuit 12, a control signal "ct1" is transmitted through the signal line 14 to the display device scanning driver 22 and a control signal "ct1" is transmitted through signal line 15 to the display device scanning driver 22. The control signal "ct1" is made up of a video signal clock, gray-level signal (video signal) such as R, G, B signals, and various control signals (such as a horizontal sync signal, polarity inversion signal, data latch signal) and the control signal "ct2" is made up of a vertical sync signal.

In particular, according to the present embodiment, the video signal processing circuit 12 is provided with an invalid bit polarity setting means configured, when an invalid bit representing a remainder bit having no data corresponding to data making up the input video signal "in" exists, to count, by using a counter (not shown), the number of "0s" ("L"; low level) and the number of "1s" ("H"; high level) being gray-level data (binary number) for the input video signal "in" and to compare the numeral size between the number of the "0s"

and the number of the "1s" for judgment and, and to set the polarity (0 or 1) of the invalid bit, based on the judgment result.

The video display section 30 is made up of, for example, a liquid crystal panel and has specified scanning lines (not shown), specified data lines (not shown), and a pixel formed at an intersection point of each of scanning lines and each of data lines. The display device driving driver 21, based on the control signal "ct1" transmitted from the video signal processing circuit 12, is configured to write pixel data based on the output video signal "va" provided through the video signal line 13 on each data line of the video display section 30. The display device scanning driver 22, based on the control signal "ct1" transmitted from the video signal processing circuit 12, outputs a scanning line driving signal to drive, in a predetermined order and in a line-sequential manner, each scanning line of the video display section 30.

Figure 2:
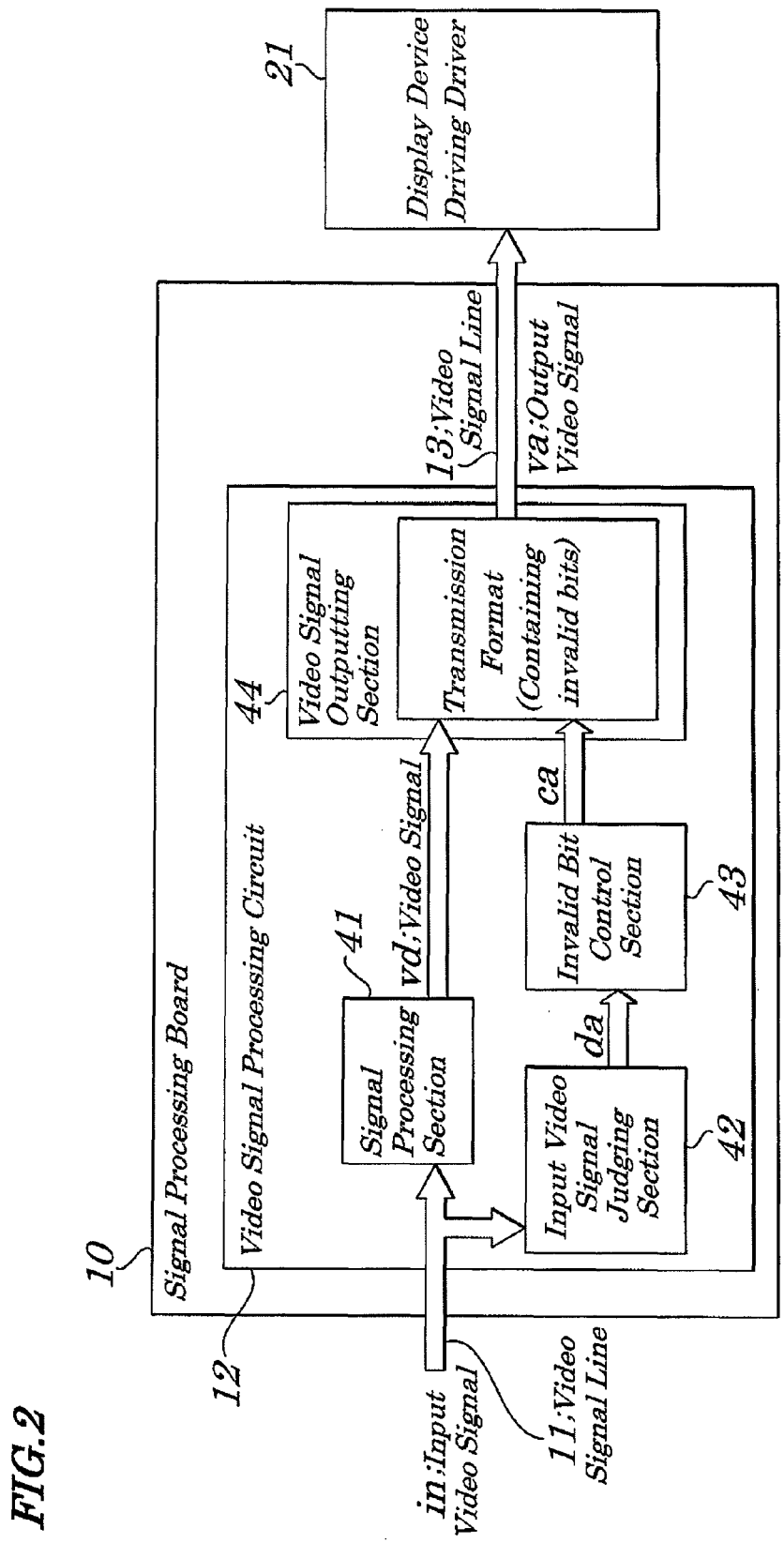
FIG. 2 is a block diagram showing a signal processing board of FIG. 1 and a display device driving driver drawn in an extracted manner and electrical configurations of inside portions of the video signal processing circuit according to the first exemplary embodiment of the present invention.

FIG. 2 is a block diagram showing the signal processing board 10 of FIG. 1 and the display device driving driver 21 drawn in an extracted manner and electrical configurations of inside portions of the video signal processing circuit 12.

The video signal processing circuit 12 includes, as shown in FIG. 2, a signal processing section 41, an input video signal judging section 42, an invalid bit control section 43, and a video signal outputting section 44. The signal processing section 41 performs the signal processing (rearrangement processing of video signals) on an input signal "in" to output a video signal "vd". The input video signal judging section 42 counts the number of "0s" and the number of "1s" for gray-level data (binary number) of the input video signal "in" to compare the numerical size of the number of "0s" and the number of "1s" for polarity judgment and to output a judged result "da". The invalid bit control section 43, based on the judged result "da" by the input video signal judging section 42, outputs an invalid bit control signal "ca" to determine the polarity ("0" or "1") of the invalid bit.

In particular, according to the present embodiment, the input video signal judging section 42 is configured to count the number of "0s" and the number of "1s" for gray-level data contained in the input video signal "in" existing within a period corresponding to a predetermined period in the output video signal "va" in which the invalid bit in the form of the transmission format exists. The invalid bit control section 43 outputs an invalid control signal "ca", when the number of "1s" counted by the input video signal judging section 42 is more than half of the total number, to determine the polarity of the invalid bit to be "1" and, when the number of "0s" is more than half of the total number, to determine the polarity of the invalid bit to be "0" and, furthermore, when the number of "1s" is the same as the number of "0s", to determine the polarity of the invalid bit to be 0. The video signal outputting section 44, based on an invalid bit control signal "ca", sets the polarity of an invalid bit of a video signal "vd" to output an output video signal "va". Thus, the above input video signal judging section 42 and invalid bit control section 43 make up the invalid bit polarity setting means.

Figure 3:
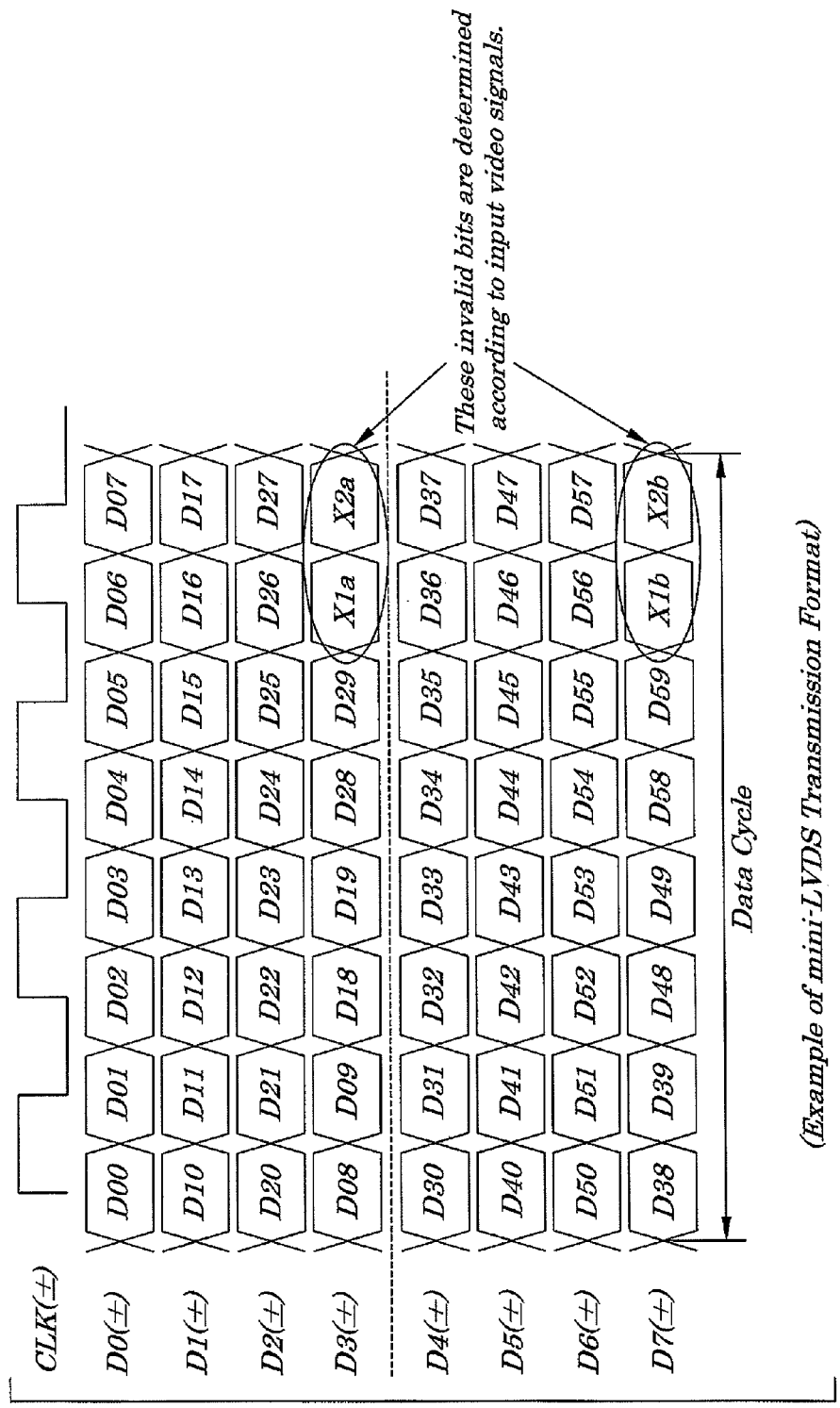
FIG. 3 is a diagram showing an example of video signal processing of a mini-LVDS (Low Voltage Differential Signaling) transmission format in the video signal processing circuit of FIG. 2.
Figure 4:
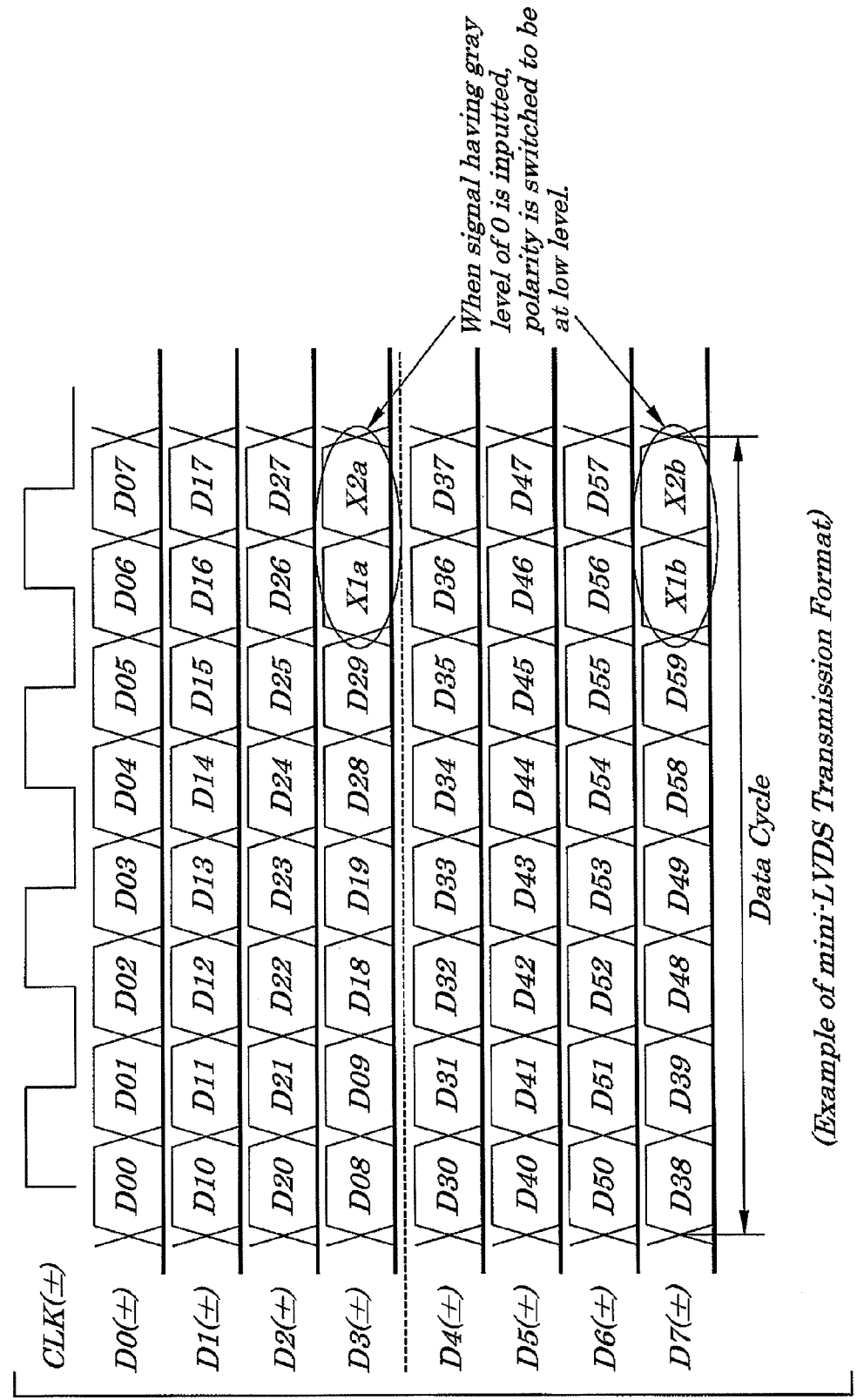
FIG. 4 is a diagram showing an example of signal arrangement of the mini-LVDS transmission at time of inputting of "0" gray levels.
Figure 5:
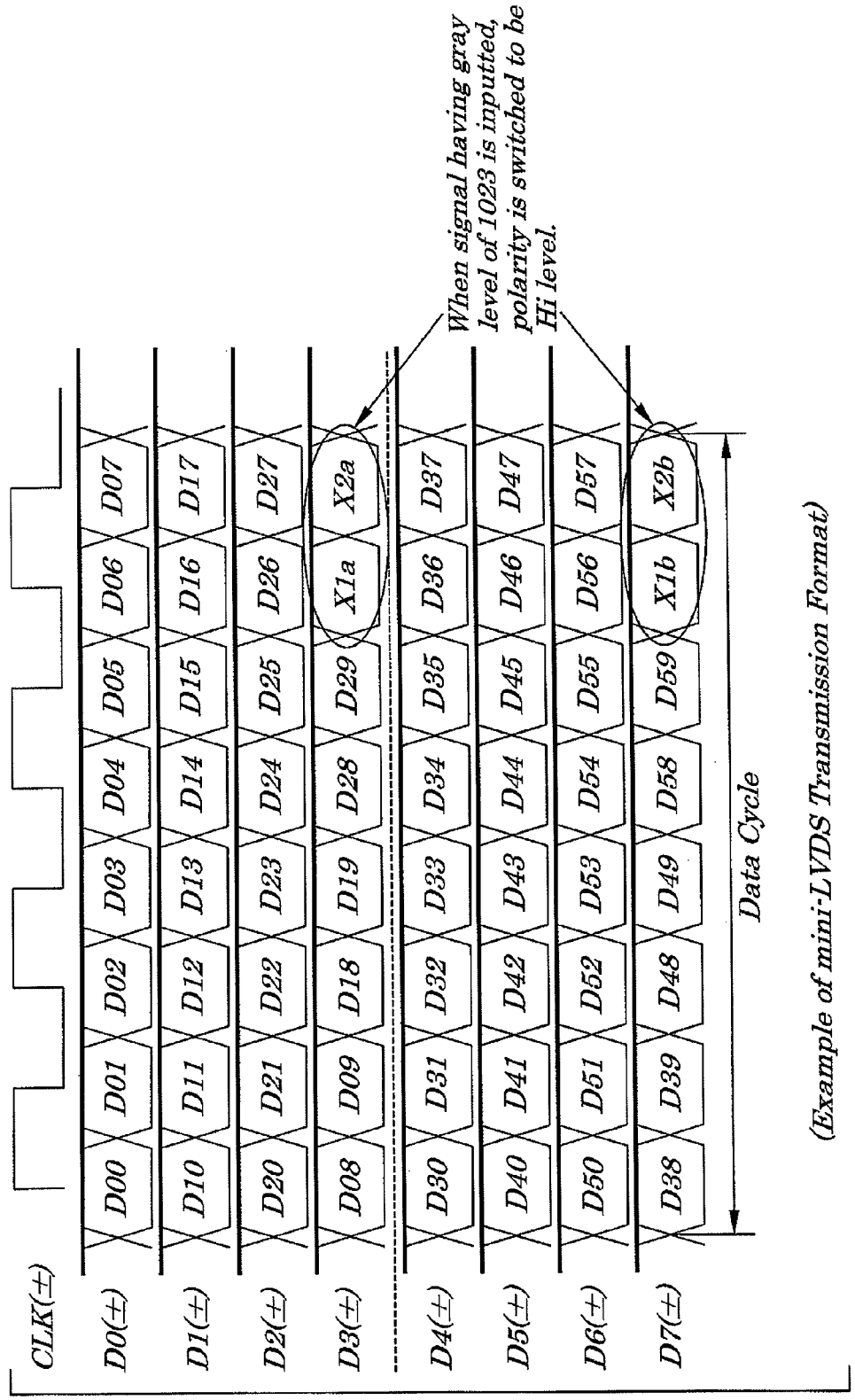
FIG. 5 is a diagram showing an example of signal arrangement for the mini-LVDS transmission at time of inputting of "1023" gray levels.

FIG. 3 is a diagram showing an example of video signal processing of a mini-LVDS transmission format in the video signal processing circuit 12 of FIG. 2. FIG. 4 is a diagram showing an example of signal arrangement of the mini-LVDS transmission at time of inputting of a gray level of 0. FIG. 5 is a diagram showing an example of signal arrangement for the mini-LVDS transmission at time of inputting of a gray level of 1023. FIG. 6 is a diagram showing the number of valid bits "1s" and the polarities of invalid bits at the time.

By referring to these drawings, a video signal processing method to be used in the video signal processing circuit 12 of the present embodiment is described.

In the video signal processing circuit 12, the invalid bit polarity setting means (input video signal judging section 42 and invalid bit control section 43), when the invalid bit having no data corresponding to the data making up the input video signal "in" exists in the transmission format of the output video signal "va", counts the number of "0s" and "1s" making up gray level data and compares the numerical size between the number of "0s" and the number of "1s" for polarity judgment and, based on the judgment result, the polarity ("0" or "1") of the invalid bit is set (invalid bit polarity setting processing). Then, the output video signal "va" having a set polarity of an invalid bit is transmitted through the video signal line 13.

In the invalid bit polarity setting processing, the number of "0s" and "1s" making up the gray-level data of the input video signal "in" are counted by the input video signal judging section 42 and the numerical size between the number of "0s" and "1s" is compared for polarity judgment and a judged result "da" is outputted (Input video signal judging processing). Based on the judged result "da" provided by the input video signal judging section 42, the polarity of the invalid bit is determined by the invalid bit control section 43. In this case, in the input video signal judging processing, the number of "0s" and the number of "1s" for gray-level data of the input video signal "in" corresponding to the output video signal "va" outputted in a predetermined period during which an invalid bit exists in the transmission format are counted by the input video signal judging section 42 and, in the invalid bit polarity determining processing, when the number of "1s" is more than half of the total number, the polarity of the invalid bit polarity is determined to be "1" by the invalid bit control section 43 and, when the number of "0s" is more than half of the total number, the polarity of the invalid bit is determined to be "1" by the invalid bit control section 43. Moreover, in the invalid bit polarity determining processing, when the number of "1s" is the same as the number of "0s", the polarity of the invalid bit is determined to be "0" by the invalid bit control section 43.

That is, the output video signal "va" having undergone signal processing is outputted, by the video signal processing circuit 12, in a specified format predetermined in response to a demand from the display device driving driver 21 and then is inputted through the video signal line 13 into the video signal processing circuit 12. In the present embodiment, attention is paid to the output video signal "va" transmitted through the video signal line 13 connected between the video signal processing circuit 12 and the display device driving driver 21.

In the case of, for example, a liquid crystal display device, a clock signal and video signal are operated at higher speed (MHz order) compared with other various control signals and, therefore, at the time of transmission of the video signal through the video signal line 13, there is a risk of the occurrence of unwanted noises caused by a transmission frequency therethrough. This unwanted noise causes EMI emissions. Since a clock is ordinarily transmitted in a predetermined period, a clock frequency component (for example, A [(MHz)]) and its higher harmonic wave component (2A [(MHz)], 3A [MHz], ..., nA[MHz]) are emitted as peak EMI noises. Moreover, though a video signal is also transmitted at higher speed in a similar manner, its frequency changes depending on a state of a displayed screen or display gray level. For example, in the case of a liquid crystal display device having a 10-bit gray level, when a raster image (solid image) having a gray level of 0 is to be displayed, a value ("0000000000") obtained by converting the gray level of 0 into 10 bit binary number is inputted using a specified format (for example, LVDS format or CMOS format) into the video signal processing circuit and, in the video signal processing circuit, this format is converted into another specified format (for example, CMOS transmission format, RSDS [Reduced Swing Differential Signaling] transmission format, mini-LVDS transmission format, or the like) for driving a driver for the liquid crystal display device so that a video signal is transmitted through the video signal line and is inputted into the driver for the liquid crystal display device to display images.

Here, when an input video signal "in" for a 10-bit solid image having a gray level of 0 is inputted into a liquid crystal display device and an output video signal "va" in a form of the mini-LVDS is transmitted to the video signal line 13 and, in signal arrangement, as shown in FIG. 3, the 10 bits are represented by gray-level bit data D00, D01, . . . , D09 and its pairs are 6 pieces (including data D00, D10, D20, D30, D40, and D50). In this case, since there are 6 pieces of 10 bit data in 4 clock periods, if 3 pairs are assigned to R, G, and B, the 3 pairs are equivalent to 2 pieces of 10-bit data for R, G, and B. That is, 2 pixel (assuming that the R, G, and B pairs are equal to 1 pixel) data can be transmitted within 4 clock periods.

Next, data (Data) cycle is described. According to the transmission format shown in FIG. 3, though 64 bit data can be transmitted within 4 clock periods, required bits are 10 bit×RGB 2 pixels (=60 bits) and, therefore, there are 4-bit remainder.

Figure 12:
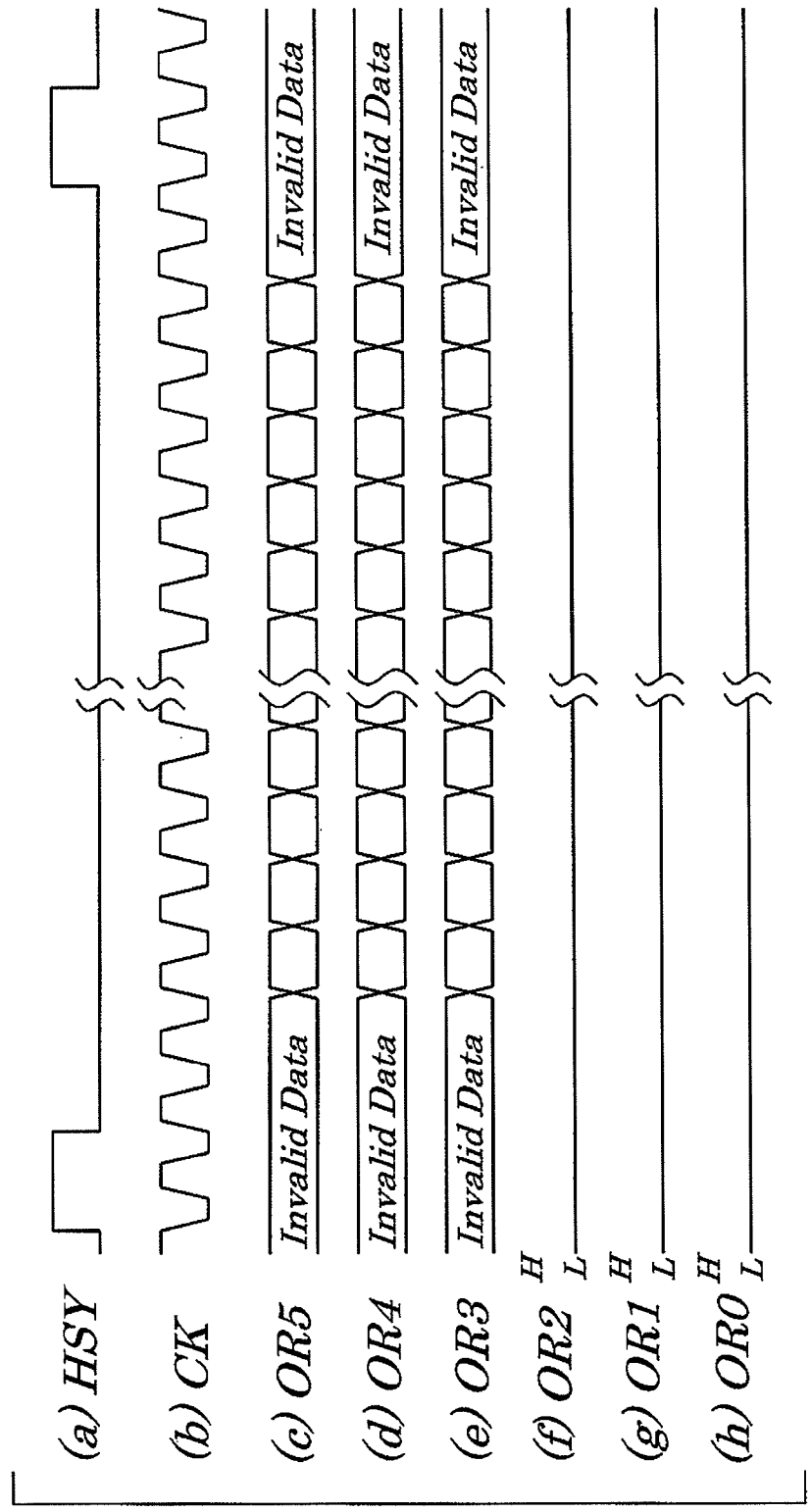
FIG. 12 is a diagram of waveforms explaining operations of the image display device disclosed in Patent Reference 1.
Figure 13:
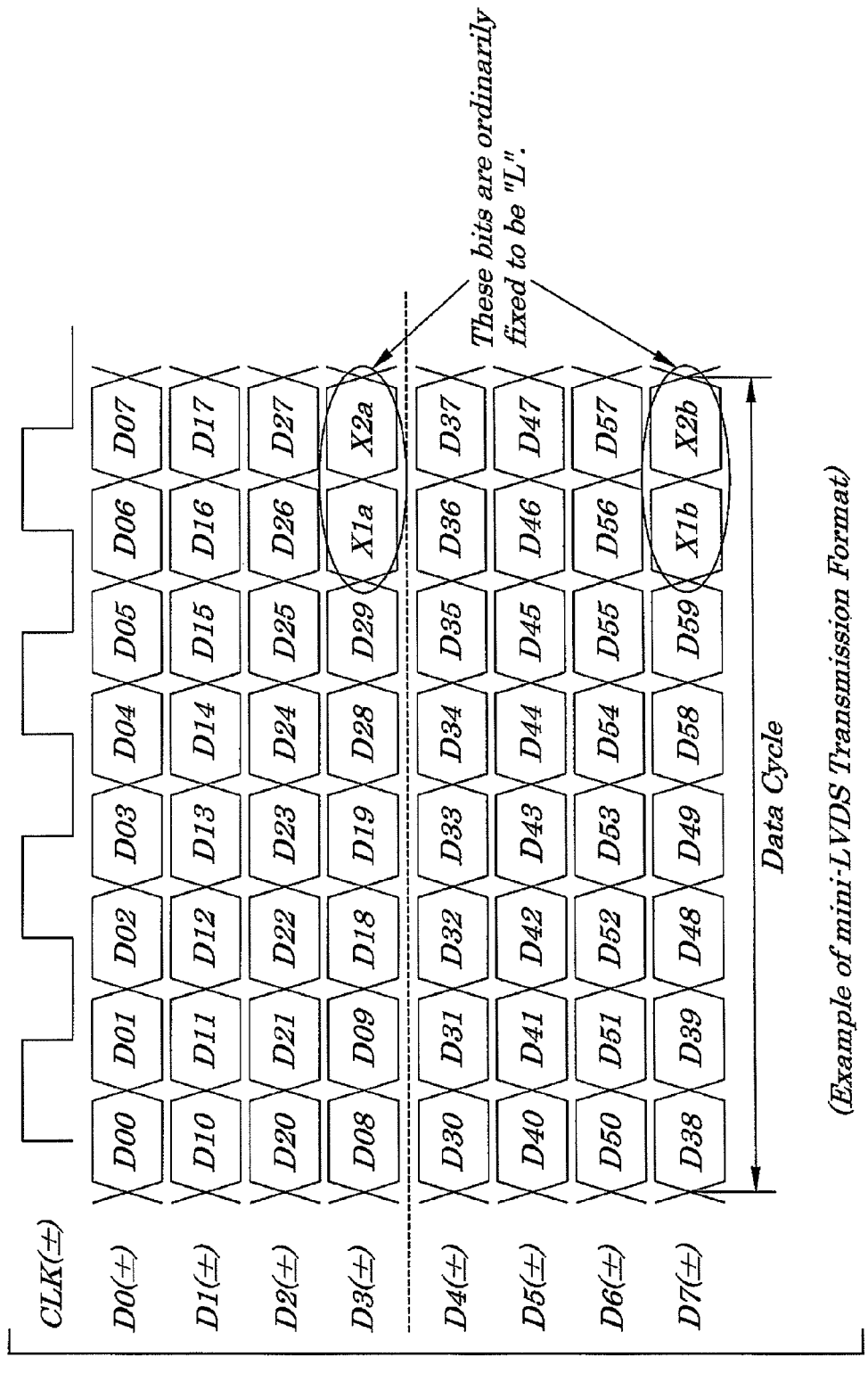
FIG. 13 is a diagram showing an example of the mini-LVDS format described in Related Arts.
Figure 14:
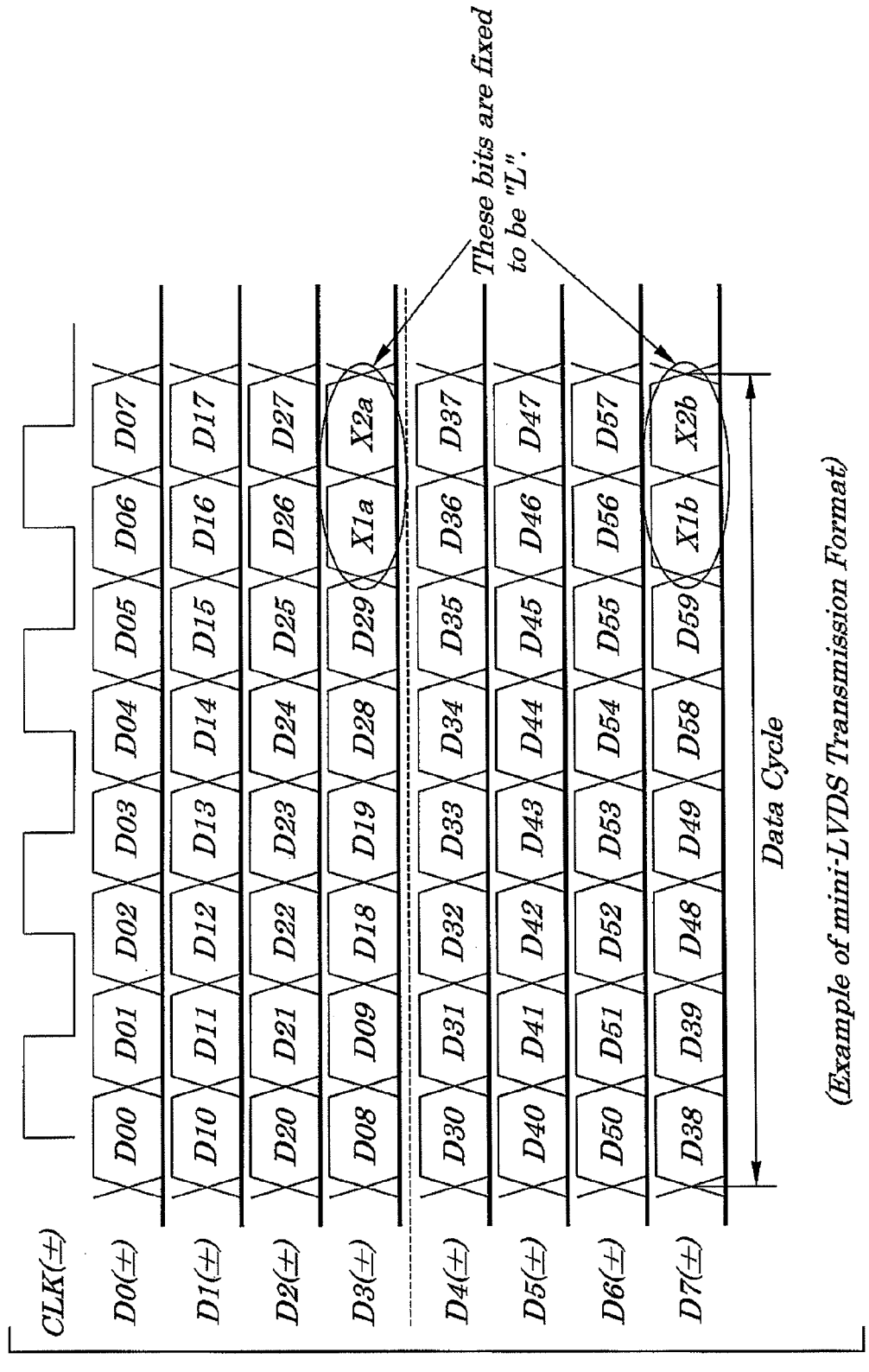
FIG. 14 is a diagram showing signal arrangement in the mini-LVDS format into which a signal having a gray level of 0 is inputted, which is described in the Related Art.

This remainder is invalid bits X1a, X2a, X1b, and X2b. In many cases, these invalid bits X1a, X2a, X2b, and X2b are set to "L" ("0") in a fixed manner to achieve reduction of power consumption. In the case of the setting like this, if a signal having a gray level of 0 ("0000000000") is inputted, a waveform of the signal transmitted through the video signal line 13 becomes the waveform as shown in FIG. 12 (that is, the level of all data being transmitted through the video signal line 13 are "L"). On the other hand, if a signal having a gray level of 1023 ("1111111111") is inputted, since the level of the invalid bits X1a, X2a, X2b, and X2b are set to "L" in a fixed manner, as shown in FIG. 13, a change in level of transmission waveform occurs before and after the invalid bits X1a, X2a, X2b, and X2b. That is, when a solid image having a gray level of 1023 is displayed, since the levels of the invalid bits X1a, X2a, X2b, and X2b are set to "L" in a fixed manner, the transmission waveform on the data line D3 (±) and the transmission waveform on the data line D7 (±) change in 4 clock periods and a peak EMI noise caused by the data lines D3 (±) and D7 (±) occurs in ¼ clock periods ([¼]×A [MHz], [2/4]×A [MHz], [¾]×A [MHz], . . . ).

Figure 11:
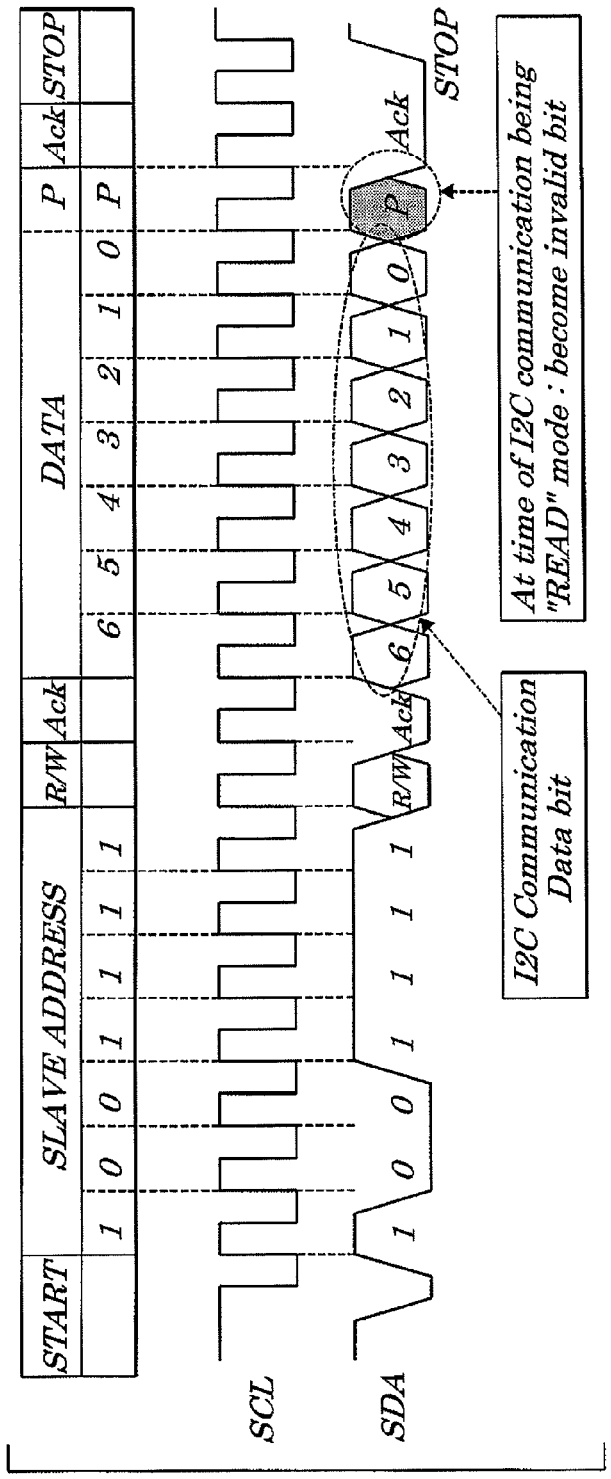
FIGS. 11A and 11B are diagrams explaining operations of the video signal processing circuit of FIG. 10.

In the present embodiment, when invalid bits exist in the mini-LVDS transmission format, even if an image having a gray level 0 or 1023 is to be displayed, the peak noise caused by a video signal can be reduced much. When the invalid bits exist in the transmission format of signals to be inputted in the display device driving driver 21, for example, if the invalid bits X1a, X2a, X2b, and X2b exist in the mini-LVDS format as shown in FIG. 11, these invalid bits X1a, X2a, X2b, and X2b are not set to "H" or "L" in a fixed manner but the input video signal judging section 42 and the invalid bit control section 43 are provided in the video signal processing circuit 12 to change the polarities of the invalid bits X1a, X2a, X2b, and X2b according to the input video signal "in".

That is, when the input video signal "in" having a gray level of 0 is inputted through the video signal line 11, the input video signal judging section 42 in the video signal processing circuit 12 judges that the signal having a gray level of 0 has been inputted to output the judgment result "da" and the invalid bit control section 43 outputs, based on the judgment result "da", an invalid bit control signal "ca" to determine the polarity of the invalid bit to be "0". Then, the output video signal "va" in the transmission format making the level of the invalid bits X1a, X2a, X2b, and X2b become "L" is outputted, as shown in FIG. 4, from the video signal outputting section 44. The output video signal "va" is inputted into the display device driving driver 21 through the video signal line 13.

Moreover, when the input video signal "in" having a gray level of 1023 is inputted through the video signal line 11, the input video signal judging section 42 in the video signal processing circuit 12 judges that the signal having the gray level of 1023 has been inputted to output the judgment result "da" and the invalid bit control section 43 outputs, based on the judgment result "da", an invalid bit control signal "ca" to determine the polarity of the invalid bit to be "1". Then, the output video signal "va" in the transmission format making the level of the invalid bits X1a, X2a, X2b, and X2b be "H" level is outputted, as shown in FIG. 5, from the video signal outputting section 44. The output video signal "va" is inputted into the display device driving driver 21 through the video signal line 13. Thus, when the input video signal "in" has a gray level of 0 or 1023, by controlling the level of the invalid bits X1a, X2a, X2b, and X2b, no change occurs in data waveform of the output video signal "va" transmitted through the video signal line 13. With no change in the waveform, EMI noise caused by the output video signal "va" is not emitted.

When the input video signal "in" has a gray level of other than 0 or 1023, there is a possibility that a plurality of bits 1 ("H") or 0 ("L") as already valid data appears on the data lines D3 (±) and D7 (±) on which the invalid bits X1a, X2a, X2b, and X2b exist. For example, as shown in FIG. 3, on the data line D3 (±) on which the invalid bits X1a and X2a exist, the polarities of all 6-bit data D08, D09, D18, D19, D28, and D29 being valid data do not always become "1" or "0".

The level setting for the invalid bits X1a and X2a to be applied to the above case is hereinafter described. First, attention is paid to the data line D3 (±) on which the invalid bits X1a and X2a exist. When the number of valid bits having the polarity of "1" is more than half of the total number in a predetermined period (data cycle), more specifically, when 4 or more data bits out of 6 data bits D08, D09, D18, D19, D28, and D29 have the polarity of "1" ("H"), control is exerted so that the polarities of the invalid bits X1a and X2a become "1" ("H") and when 3 or less data bits have the polarity of "1", control is exerted so that the polarities of the invalid bits X1a and X2a become "0" ("L"). The polarity of the valid bit existing on the date line D3 (±) has 64 patterns as shown in FIG. 6.

When considered from a viewpoint of EMI emissions, by setting the polarity of the invalid bits X1a and X2a, the number of times of waveform changes in a predetermined period can be reduced much and a pulse width can be shortened much in the predetermined period, which causes amplitude spectrum to be small in the transmission waveform. Thus, when a video signal is to be transmitted in the form of the transmission format in which the invalid bits X1a and X2a exist, by controlling the polarity of the invalid bits X1a and X2a according to the input video signal "in", the EMI emissions are reduced much. Furthermore, when 3 bits out of 6 bit data D08, D09, D18, D19, D28, and D29 have the polarity of "H", the polarity of other 3 data bits is "L" and the polarity of the invalid bits X1a and X2a may be any one of "H" and "L", however, according to the embodiment, from a viewpoint of current consumption, the polarity is set to "L".

Here, the arrangement of the 6-bit data D08, D09, D18, D19, D28, and D29 shown in FIG. 3 is one applied in the format created after performing signal processing on the input format for the display device driving driver 21 in the video signal processing circuit 12 and the bit arrangement in the format for the input video signal "in" corresponds, in a one-to-one manner, to the bit arrangement in the input format of the display device driving driver and, therefore, the position of the bit arrangement of the 6-data D08, D09, D18, D19, D28, and D29 on the data line D3 (±) in the format of the input signal "in" can be known in advance and all that is here required is to judge whether the polarity of the bit in the position is "0" or "1". In accordance to the transmission format in which the polarity of the invalid bit has been determined by the invalid bit control section 43, an output video signal "va" is outputted from the video signal outputting section 44 and is inputted through the video signal line 13 into the display device driving driver 21.

The same process as above is performed on the data line D7 (±) in FIG. 3; that is, the polarity (number of "1s") of each bit contained in the 6-bit arrangement of data D38, D39, D48, D49, D58, and D59 is counted and control is exerted on the polarity in a manner in which, if the number of "1s" is 4 or more, the polarity of the invalid bits X1b and X2b is set to "1" and, if the number of "1s" is 3 or less, the polarity of the invalid bits X1b and X2b is set to "0" and the resulting data is outputted from the video signal outputting section 44. The data line D0 (±), D1 (±), D2 (±), D3 (±) can be thought as a minimum unit for signal processing and, even if the number of ports increases and data line D8 (±) (not shown) and thereafter occurs, the same processing as above may be performed.

Thus, according to the present embodiment, by controlling the level of the invalid bits X1a and X2a depending on the input video signal "in", the waveform change of the video signal transmitted through the video signal line 13 is made necessarily minimum. For example, as shown in FIG. 4, when the input video signal "in" having a gray level of 0 is inputted, the level of the data bit on the data line D3 (±) always becomes "L", thus causing no change in the waveform. Also, as shown in FIG. 5, when the input video signal "in" having a gray level of 1023 is inputted, the level of the data bit on the data line D3 (±) always becomes "H", thus causing no change in the waveform. Therefore, for example, when the input video signal "in" has a gray level of 0 or 1023, by exerting control on the level of the invalid bits X1a and X2a depending on the input video signal "in", a change in the waveform of data signals on the data line. D3 (±) can be eliminated, which makes it possible to reduce noises (frequency component of ¼ of a clock) caused by the output video signal "va".

Moreover, in the case of a signal having other gray levels, as shown in FIG. 6, when the number of "1s" of valid bits within a predetermined period (data cycle) exceeds half of the total number, more specifically, out of 6 bits of data D08, D09, D18, D19, D28, and D29, the level of 4 or more bit data is "1", by exerting control on the invalid bits X1a and X2a so that their polarities become "1" ("H") and, in other cases (the number of "1s" is less than 3), so that their polarities become "0" ("L"), the number of times of waveform changes can be reduced much and the pulse width in a predetermined period can be shortened much. In the case where the gray level is 0 or 1023, processing can be performed by following this control rule.

Next, reasons for the fact that the EMI emissions can be improved by making the polarity of invalid bits coincide with that in the case where the number of the polarities ("0" or "1") of video signals is larger. From a viewpoint of reduction of EMI emissions, it is better that the number of times of waveform changes in a predetermined period is made smaller as much as possible. This is because, as shown in the examples of the case of the gray level being 0 and 1023, the periodical occurrence of changes in voltage waveforms ("0" and "1") in high speed signals (video signals in the present embodiment) shows that changes in currents occur periodically and this current change causes an electric field and magnetic field around the video signal line 13 used to transmit a video signal which are emitted as EMI emissions. Therefore, by making the waveform changes be necessarily minimum, the EMI emissions can be so eliminated. As in the case of the gray level being 0 or 1023, if the polarities other than those of the invalid bits in data bits are all the same, by making the polarities of the invalid bits coincide with the same polarities, an excessive frequency spectrum and, as a result, EMI emissions can be eliminated.

Additionally, it is better that a pulse width of data in a predetermined period is shortened. This is because, when a frequency spectrum is derived by the Fourier expansion of transmitted waveforms, if a duty of a pulse is shorter, an amplitude spectrum can be made smaller. Ideally, it is better that a duty is 0, however, this is true in the special case where all the polarities are the same (for example, as in the case of the gray level being 0 or 1023, the polarities of valid bits are all the same on the data line D3 (±)) and 64 combination patterns of the valid bits on the data line D3 (±) are available as shown in FIG. 6. In this combinations, if a pulse width is made shorter in a predetermined period, an amplitude spectrum strength becomes smaller and, therefore, the polarity of the invalid bits X1a and X2a is obtained by taking considerations so that the pulse width is made shorter and the occurrence of waveform changes is eliminated as much as possible. Thus, by controlling the polarity of the invalid bits X1a and X2a depending on the input video signal "in", when the output video signal "va" using the transmission format containing the invalid bits X1a and X2a is transmitted, EMI noises can be reduced.

In the control of EMI emissions, a specification value of the emission levels of an unwanted waveform is designated per frequency and, if the transmission waveform has a plurality of frequency components, the number of frequency spectra is made larger, which causes an increase of a possibility that the EMI emissions exceed its specification value. Therefore, the frequency component of a transmission waveform of a video signal should be reduced as much as possible and, by decreasing the number of occurring frequency spectra, originally unwanted EMI spectra can be eliminated thus enabling easy measurement against the EMI emissions.

Since there is no clear specification for a display pattern applicable to a checking process of EMI emissions, it is desirable that the EMI emission levels for all display patterns are made low. Moreover, as the number of ports for video signals increases due to high definition and increasing in size in display devices, the number of invalid bits increases as well and, therefore, if the invalid bits are not controlled, the level of unwanted peak noises caused by the video signals becomes higher and, the number of parts necessary to take measures against noises possibly increases.

According to the present invention, as described above, when invalid bits exist in the transmission format being transmitted through the video signal line 13, by changing the polarity of the invalid bit depending on a gray level (gray level in a pixel or its adjacent pixel) of a display screen and by reducing the occurrence of an EMI peak noise being originally unwanted, the EMI emissions can be eliminated.

Second Exemplary Embodiment

Figure 7:
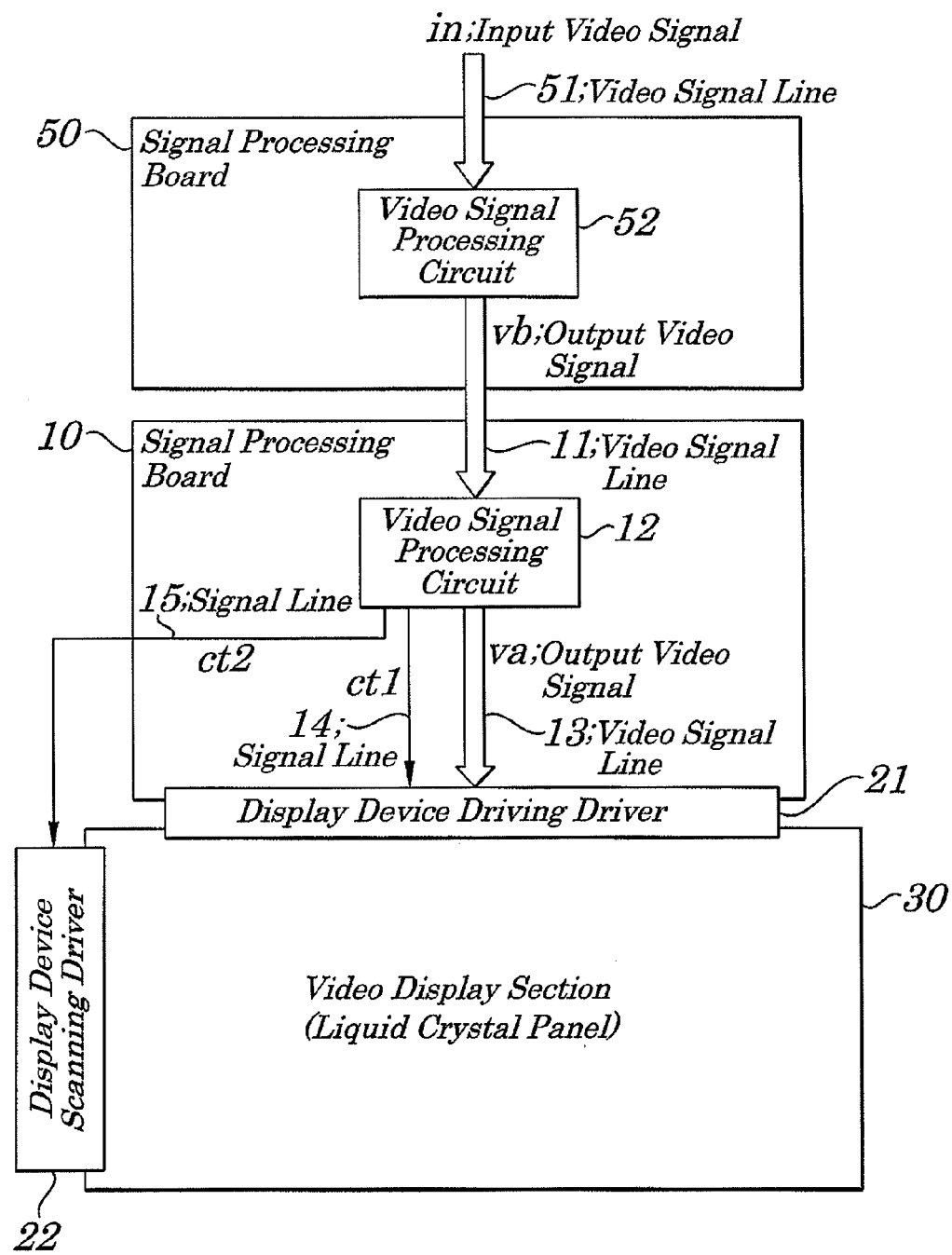
FIG. 7 is a block diagram showing electrical configurations of main portions of an image display device having a video signal processing circuit according to a second exemplary embodiment of the present invention.

FIG. 7 is a block diagram showing electrical configurations of main portions of an image display device having a video signal processing circuit according to a second exemplary embodiment of the present invention;

In the image display device of the embodiment, as shown in FIG. 7, in addition to the image display device shown in FIG. 1, a signal processing board 50 is provided. The signal processing board 50 has a video signal line 51 and a video signal processing circuit 52 and shares a video signal line 11 with a signal processing board 10. The video signal processing circuit 52 performs signal processing (for example, rearrangement processing of a video signal) on an input video signal "in" transmitted through the video signal line 51 from outside and outputs an output video signal "vb" in the form of a specified transmission format (8 bit mini-LVDS format) to a video signal processing circuit 12 through the video signal line 11.

Figure 8:
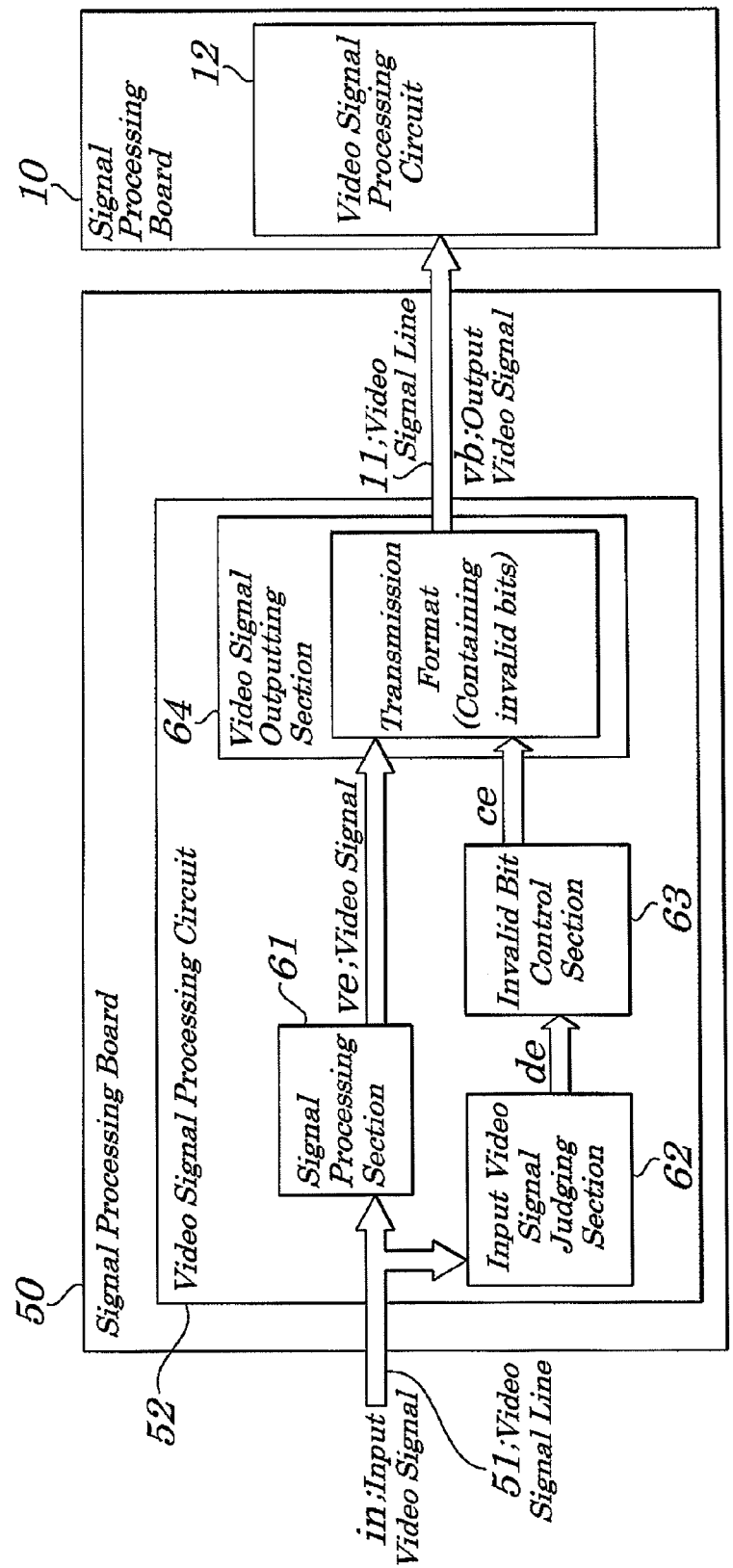
FIG. 8 is a block diagram showing electrical configurations of inside portions of the video signal processing circuit and a signal processing board and signal processing board of FIG. 7 drawn in an extracted manner.

FIG. 8 is a block diagram showing electrical configurations of inside portions of the video signal processing circuit 52 and a signal processing board 50 and signal processing board 10 of FIG. 7 drawn in an extracted manner. The video signal processing circuit 52, as shown in FIG. 8, has a signal processing section 61, an input video signal judging section 62, an invalid bit control section 63, and a video signal outputting section 64. The signal processing section 61, as in the case of the signal processing section 41 of FIG. 2, performs signal processing on an input video signal "in" and outputs a video signal "ve". The input video signal judging section 62, as in the case of the input video signal judging section 42, counts the number of "0s" and the number of "1s" of gray-level data (binary number) of the input video signal "in" to compare the numerical size between the number of "0s" and the number of "1s" for polarity judgment and to output a judged result "de". The invalid bit control section 63, as in the case of the invalid bit control section 43, based on the judged result "de" by the input video signal judging section 62, outputs an invalid bit control signal "ce" to determine the polarity ("0" or "1") of the invalid bit. The video signal outputting section 64, based on the invalid bit control signal "ce", sets the polarity of the invalid bits of the video signal "ve" and outputs an output video signal "vb".

Figure 9:
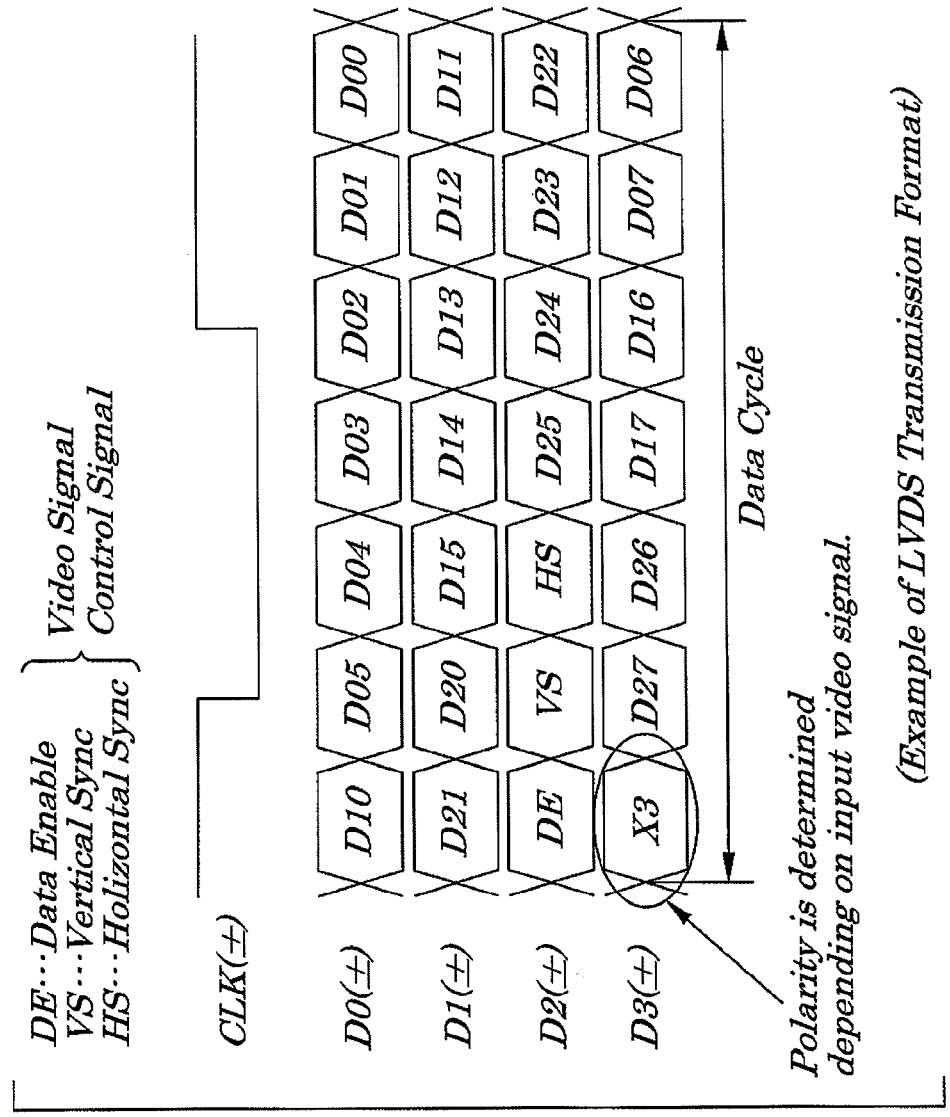
FIG. 9 is a diagram showing examples of video signal processing of the LVDS transmission format in the video signal processing circuit of FIG. 8.

FIG. 9 is a diagram showing examples of video signal processing of the LVDS transmission format in the video signal processing circuit of FIG. 8.

By referring to the drawing, a video signal processing method to be used in the video signal processing circuit 52 of the present embodiment is described.

In the video signal processing circuit 52, an output video signal "vb" is transmitted in the form of an 8-bit LVDS signal transmission format through the video signal line 11. The invalid bit in the transmission format, as shown in FIG. 9, is the bit X3 on the data line D3 (±). Here, attention is paid to data of a video signal on the data line D3 (±). As in the case of the first exemplary embodiment, if, out of 6 bit data D27, D26, D17, D16, D07, and DOE, the level of 4 or more bits is "1" ("H"), control is exerted so that the polarity of the invalid bit X becomes "1" ("H") and, in the case other than this (level of 3 or less is "0" ("L")), so that the polarity of the invalid bit X becomes "0" ("L").

That is, the input video signal "in" is rearranged by the video signal processing circuit 52 so as to have a transmission format that can be inputted into the video signal processing circuit 12. Here, the transmission format is, for example, 8 bit LVDS transmission format, however, other format containing invalid bits can be employed. Then, a gray level of the input video signal "in" is judged by the input video signal judging section 62. Since the input video signal "in" is a digital signal 0 or 1, by using the transmission format for the input video signal "in", the number of "0s" and the number of "1s" are compared for judgment. The control is exerted in a manner in which, in the 6 bit arrangement of data D27, D26, D17, and D06, a polarity of each bit (number of "1s") is counted and, if the number of "1s" is 4 or more, the invalid bit control section 63 makes the invalid bit X3 become "1" and, if the number of "0s" is 3 or less, the invalid bit control section 63 makes the invalid bit X3 become "0" and bit data is outputted from the video signal outputting section 64.

Here, the bit arrangement of the 6 bit data D27, D26, D17, D16, D07, and D06 on the data line D3 (±) shown in FIG. 9 is one applied in the format created after performing signal processing on the input format for the display device driving driver 21 in the video signal processing circuit 52 and the bit arrangement in the format for the input video signal "in" corresponds, in a one-to-one manner, to the bit arrangement in the input format of the video signal processing circuit 12 and, therefore, the position of the bit arrangement of the 6-bit arrangement of the data D27, D26, D17, D16, D07, and D06 on the data line D3 (±) in the format of the input video signal "in" can be known in advance and all that is here required is to judge whether the polarity of the bit in the position is "0" or "1". As described as above, according to the transmission format in which the polarity of the invalid bit X3 is determined by the invalid bit control section 63, the output video signal "vb" is outputted from the video signal outputting section 64 and is inputted into the video signal processing circuit 12 through the video signal line 11. As in the first exemplary embodiment, data line D0 (±), D1 (±), D2 (±), and D3 (±) can be thought as a minimum unit and even if the number of ports increases and data line D4 (not shown) and other additional data lines are added, the same processing as in the first exemplary embodiment can be performed.

Thus, according to the second exemplary embodiment, as in the case of the first exemplary embodiment, by controlling a level of an invalid bit X3 depending on the input video signal "in", EMI emissions can be eliminated.

Third Exemplary Embodiment

In the third exemplary embodiment of the present invention, instead of the input video signal judging section 42 shown in FIG. 2 and the invalid bit setting means made up of the invalid bit control section 43 shown in FIG. 2, an invalid bit polarity setting means having different functions (not shown) is provided.

The invalid bit polarity setting means sets, using a comparator for one bit, the polarity of the invalid bits X1a and X2a contained in the output video signal "va" to be the same as the polarity of one valid data bit existing before the invalid bit X1a in terms of time series.

That is, in the first and second exemplary embodiments, the polarity of an invalid bit is determined by counting the number of the polarity of bits in the input video signal "in" within a predetermined period, however, from a viewpoint of decreasing the times of changes of waveforms, the polarity of one valid data existing before an invalid bit may be maintained. For example, as shown in FIG. 3, the bit existing just before the invalid bit X1a is the data D29 and, if the polarity of the data D29 is "H", control is exerted so that the invalid bit X1a is "H" and, if the polarity of the data D29 is "L", control is exerted so that the invalid bit X1a is "L". Then, it is natural that, since the polarity of the invalid bit X1a is maintained, if the polarity of the data D29 is "H", the invalid bit X1a is set to "H" and, since the polarity of the invalid bit X1a is "H", the polarity of the invalid bit X2a is also set to "H". When the polarity of the data D29 is "L", since the polarity of the invalid bit X1a is "L", the polarity of the invalid bit X2a is set also to "L". By operating as above, the times of changes of waveforms are reduced thus resulting in a decrease of EMI emissions. No counter is needed to count the number of "0s" and "1s" of gray-level data of the input video signal "in", which enables simplification of the circuit configuration.

Fourth Exemplary Embodiment

Figure 10:
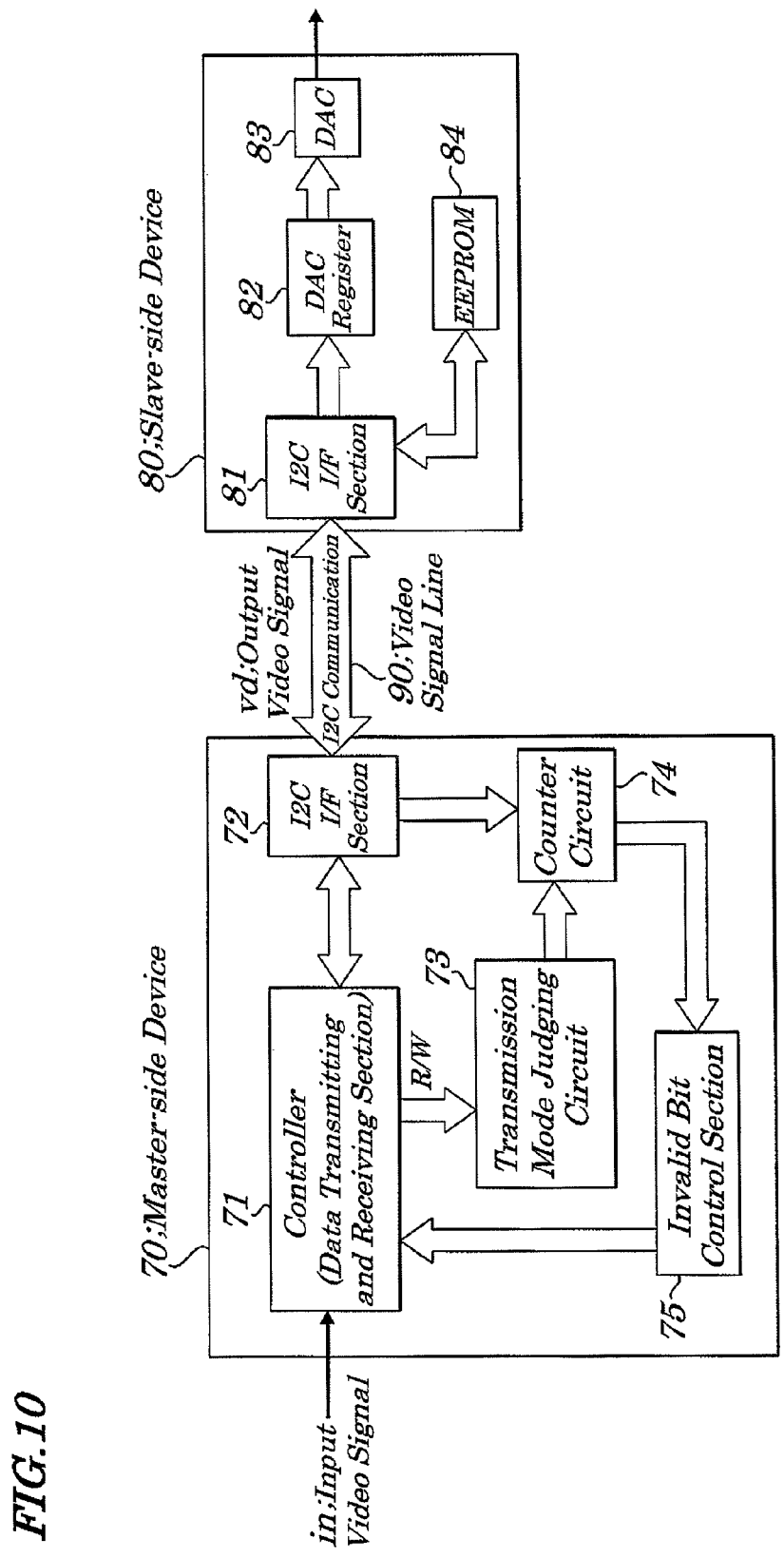
FIG. 10 is a block diagram showing electrical configurations of main portions of the video signal processing circuit of a fourth exemplary embodiment of the present invention and also configurations of a communication system in which the video signal processing circuit is used.

FIG. 10 is a block diagram showing electrical configurations of main portions of the video signal processing circuit of the fourth exemplary embodiment of the present invention and also configurations of a communication system in which the video signal processing circuit is employed.

The video signal processing circuit, as shown in FIG. 10, is made up of a master-side device 70 to which a slave-side device 80 is connected through a video signal line 90. The master-side device 70, slave-side device 80, and video signal line 90 are placed on a signal processing board (not shown). The master-side device 70 has a controller (data transmitting and receiving section) 71, an I2C (Inter Integrated Circuit) I/F section 72, a transmission mode judging circuit 73, a counter circuit 74, and an invalid bit control section 75.

The controller 71 is configured to perform predetermined signal processing on an input video signal "in" and to transmit the obtained output video signal "vd" made up of, for example, an I2C communication format through the I2C I/F section 72 and video signal line 90. Especially, in the fourth exemplary embodiment, the controller 71 outputs, in every predetermined period, an address to the slave-side device 80 having a plurality of data storing devices and a reading (receiving) and writing (transmitting) demand "R/W" signal and transmits an output video signal "vd" or receives data from the slave-side device 80 and, further, transmits, at the time of transmission mode, a bit data for device selection to select a given device out of data storing devices to the video signal line 90.

The transmission mode judging circuit 73 judges, based on the receiving and transmitting demand "R/W signal", whether the video signal processing circuit is in a transmitting mode or in a receiving mode, in every predetermined period. The counter circuit 74, when its transmission mode is judged, by the transmission mode judging circuit 73, as the receiving mode, captures data provided by the slave-side device 80 from the I2C I/F section 72 and counts the number of low levels (hereinafter, may be referred to as "0") and high levels (hereinafter, may be referred to as "1") in every period.

The invalid bit control section 75, at the time of the receiving mode during which the data storing device mounted in the slave-side device 80 is not selected, is configured to compare a numerical size between the number of "0s" and the number of "1s" counted by the counter circuit 74 for judgment and to determine, based on the judgment result, the polarity of the device selection data bit. Then, the invalid bit control section 75, when the number of "1s" is more than half of a total number, determines the polarity of the invalid bit (device selection bit data) to be "1" and, when the number of "0s" is more than half of the total number, the polarity of the invalid bit to be "0" and, further, when the number of "1s" is the same as that of "0s", the polarity of the invalid bit to be "0". That is, an invalid bit polarity setting means is made up of the transmission mode judging circuit 73, counter circuit 74, and invalid bit control section 75.

The slave-side device 80 has an I2C I/F section 81, a DAC (Digital Analog Converter) register 82, a DAC 83, and an EEPROM (Electrically Erasable and Programmable Read Only Memory) 84. The I2C I/F section 81 captures an output video signal "vd" from the master-side device 70 and outputs, based on the device selection bit data, the captured signal to the DAC register operating as a data storing device or to the EEPROM 84. The DAC register 82 stores the output signal "vd" transmitted from the I2C I/F section 81. The DAC converts the output video signal "vd" stored in the DAC register 82 from a digital signal to an analog signal and outputs the converted signal to an image display device (not shown) or the like. The EEPROM 84 stores the output video signal "vd" transmitted from the I2C I/F section 81 and erases the signal after predetermined operations.

FIG. 11 is a diagram explaining operations of the video signal processing circuit of FIG. 10.

By referring to the drawings, a video signal processing method to be used for the video signal processing circuit of the present invention is described.

In this video signal processing circuit, in every predetermined period, an address of the slave-side device 80 and a signal demanding reading (receiving)/writing (transmitting) operations is outputted to the slave-side device 80, and the output video signal "vd" is transmitted or data provided by the slave-side device 80 is received and, further, at the time of transmitting mode, device selection bit data to select a given device for each data storing device of the slave-side device 80 is transmitted through the video signal line 90. In the invalid polarity setting means (transmission mode judging circuit 73, counter circuit 74, invalid bit control section 75), at the time of receiving mode, the number of "0s" and "1s" received from the slave-side device 80 are counted in every determined period and the numeral size between the number of "0s" and the number of "1s" is compared for judgment and, based on the judgment result, the polarity of the device selection bit data becoming invalid data is set.

In the invalid bit polarity setting processing, whether the video signal processing circuit is in the transmitting (writing) mode or in the receiving (reading) mode is judged by the transmission mode judging circuit 73, based on the signal provided by the "R/W" demand operation, in every determined period (transmission mode judging processing).

After the transmission mode is judged by the transmission mode judging circuit 73, the number of "0s" or "1s" received from the slave-side device 80 are counted by the counter circuit 74 in every determined period (counting processing). Then, the numerical size between the number of "0s" and the number of "1s" obtained by the slave-side device 80 is compared for polarity judgment in every determined period and, based on the judgment result, the polarity of the invalid bit (device selection bit data) is determined (invalid bit polarity determining processing). In this invalid polarity determining processing, when the number of "1s" received from the slave-side device 80 is more than half of the total number, the polarity of the invalid bit (device selection bit data) is determined to be "1" and, when the number of "0s" is more than half of the total number, the polarity of the invalid bit is determined to be "0" and, when the number of "1s" is the same as that of "0s", the polarity of the invalid bit is determined to be "0".

That is, in the video signal processing circuit, as shown in FIG. 11A, when the level of a clock SCL is "1" (high level, "H") and the level of serial data SPA is "1", by setting the level of the serial data SPA to "0" (low level, "L"), the signal operation gets into a start (START) condition. After that, by making data transition when the level of the clock SCL is "0", the serial data SPA is transmitted; for example, 7 bit address ("SLAVE ADDRESS", "1001111") and receiving/transmitting ("R/W") demand signal are transmitted. An acknowledge signal Ack is returned from the slave-side device 80 designated by the address to the master-side device 70 and slave-side device 80 carries out, based on the receiving/transmitting ("R/W") demand signal, communication with the master-side device 70.

When the receiving/transmitting ("R/W") demand operation is in the transmitting ("WRITE") mode, data ("DATA", "6543210", I2C communication data bit) corresponding to an output video signal "vd" and device selection bit data "P" are transmitted from the master-side device 70 to the slave-side device 80 and, as shown in FIG. 11B, when the value of 1 bit "P" ("P+bit value") is "1", the data is written into the register (DAC register) 82 and, when the value of "P" is "0", the data is written into the EEPROM 84. Then, an Acknowledge signal Ack is returned from the slave-side device 80 to the master-side device 70 and, when the clock SCL is "1" ("H") and the serial data SDA is "0", by setting, using the controller 71 of the master-side device 70, the serial data SDA to "1" ("H"), the signal operation gets into a stop ("STOP") condition.

On the other hand, when the receiving/transmitting ("R/W") demand operation is in the receiving ("READ") mode, data ("DATA", "6543210", I2C communication data bit) is received by the master-side device 70 from the slave-side device 80, however, as shown in FIG. 11B, the device selection bit data "P" becomes "invalid bit "X" ("Don't care"). At this point of time, the number of "0s" and number of "1s" of data "DATA" received from the slave-side device 80 are counted by the counter circuit 74 in a predetermined period, for example, in a period from the start condition to stop condition (counting processing). The numerical size between the number of "0s" and number of "1s" of date "DATA" is compared by the invalid bit control section 75 and the polarity of the device selection bit data "P" is determined based on the judgment result. In this case, if the number of "1s" of data "DATA" is 4 or more, the polarity of the device selection bit data "P" is determined to be "1" and, if the number of "0s" of data is 3 or less, the polarity is determined to be "0" and, if the number of "1s" is the same as that of "0s", the polarity is determined to be "0".

As described above, according to the fourth exemplary embodiment, at the time of the receiving ("READ") mode, the number of "0s" and "1s" of data received from the slave-side device 80 are counted in a predetermined period and the numerical size between the number of "0s" and number of "1s" is compared for polarity judgment and the device selection bit data "P" is set based on the judgment result and, therefore, the times of waveform changes decrease, thus resulting in the reduction of EMI emissions. In particular, the present invention is effective in the reduction of the EMI emissions when the frequency of the I2C communication format is made higher.

Fifth Exemplary Embodiment

In the video signal processing circuit of the fifth exemplary embodiment of the present invention, instead of the invalid bit polarity setting means made up of the transmission mode judging circuit 73, counter circuit 74, invalid bit control section 75, the invalid bit polarity setting means (not shown) having different functions is provided. Then, the invalid bit polarity setting means, at the time of the receiving mode wherein each of the data storing devices of the slave-side device 80 is not selected, is configured to set the polarity of the device selection bit data "P" becoming the invalid bit to be the same as the polarity of one valid data bit existing before the invalid bit in terms of time series.

In the video signal processing circuit, at the time of receiving mode, the polarity is set by the invalid bit polarity setting means to be the same as the polarity of one valid data bit existing before the invalid bit in terms of time series (invalid bit polarity setting processing). For example, the polarity of the device selection bit data "P", if the polarity of one bit before the invalid bit is "1", is set "1" and, if the polarity of one bit before the invalid bit is "0", is set to "0". By setting as above, the times of waveform changes are decreased, thus resulting in the reduction of the EMI emissions. Moreover, the counter to count the number of "0s" and "1s" received from the slave-side device 80 is not required, which can simplify the circuit configurations.

Thus, exemplary embodiments of the present invention are described by referring to the drawings, however, it is apparent that the present invention is not limited to the above exemplary embodiments and may be changed and modified without departing from the scope and spirit of the invention.

For example, the format by which an output video signal "va" is transmitted through the video signal line 13 in FIG. 2 and output vide signal "vb" to be transmitted to the video signal line 11 shown in FIG. 8 may be acceptable so long as it contains invalid bits and is not limited to the mini-LVDS format described in the above embodiments. Also, the video signal processing circuit of the present invention is not limited to the use for an image display device. Further, the image display device of each of the above embodiments is not limited to a liquid crystal device and may be, for example, a plasma display device. The plurality of the slave-side devices shown in FIG. 10 may have a party line configuration. The bit number of the addresses ("SLAVE ADDRESS") in FIG. 11A is not limited to 7 bits. The bit number of the device selection bit data "P" in FIG. 11A is not limited to one bit and may be 2 bit or plural bits. In FIG. 11A, the reading (receiving)/writing (transmitting) ("R/W") demand operation is in the transmitting ("Write") mode, the data ("DATA") corresponding to the output vide signal "vd" is transmitted from the master-side device 70 to the slave-side device 80, however, other control signals to control the slave-side device 80 may be contained in the data ("DATA") to be transmitted to the slave-side device 80.

The present invention can be applied to a general video signal processing circuit that transmits a video signal and, in particular, is effective in the case where an invalid bit exists in the transmission format for an output video signal.

What is claimed is:

1. A video signal processing circuit for performing predetermined signal processing on an input video signal to transmit an output video signal in a form of a specified transmission format through a video signal line, comprising:
   an invalid bit polarity setting unit, when there exists an invalid bit having no data corresponding to data making up said input video signal in the specified transmission format of said output video signal, to count a number of low and high levels of gray-level data of said input video signal, to compare a numerical size between said number of low levels and said number of high levels for judgment, and to set a polarity of said invalid bit based on a result of the judgment.

2. The video signal processing circuit according to claim 1, wherein said invalid bit polarity setting unit comprises:

an input video signal judging unit to count the number of low and high levels of said gray-level data of said input video signal and to compare a numerical size between said number of low levels and number of high levels for judgment to output a result of the judgment and, an invalid bit polarity determining unit to determine a polarity of said invalid bit based on the result of the judgment obtained by said input video signal judging unit.

3. The video signal processing circuit according to claim 2, wherein said input video signal judging unit is configured to count said number of low and high levels of said gray-level data of said input video signal existing within a period corresponding to a predetermined period in said output video signal in which said invalid bit exists, and wherein said invalid bit polarity determining unit to determine a polarity of said invalid bit to be high level when said number of high levels is more than half of a total number and to determine a polarity of said invalid bit to be low level when said number of low levels is more than half of the total number.

4. The video signal processing circuit according to claim 3, wherein said invalid bit polarity determining unit is configured to determine a polarity of said invalid bit to be low level when said number of high levels is same as that of low levels.

5. A video signal processing circuit for performing predetermined signal processing on an input video signal to transmit an output video signal in a form of a specified transmission format through a video signal line, comprising:

an invalid bit polarity setting unit, when there exists an invalid bit having no data corresponding to data making up said input video signal in the specified transmission format of said output video signal, to set a polarity of said invalid bit existing in the specified transmission format of said output video signal to be same as a polarity of one valid data bit before valid data bit in terms of time series.

6. A video signal processing circuit for performing predetermined signal processing on an input video signal to transmit an output video signal in a form of a specified transmission format through a video signal line, which is configured as a master-side device to which a slave-side device having a plurality of data storing devices and an address is connected through said video signal line and which outputs said address and a signal demanding transmitting/receiving operations, in every determined period, to said slave-side device and transmits said output video signal or receives data from said slave-side device and also outputs device selection bit data for selection of each of said data storing devices of said slave-side device at time of transmitting mode and which has an invalid bit polarity setting unit, at time of receiving mode during which each of said data storing devices of said slave-side device is not selected, to count said number of low and high levels of said data received from said slave-side device in every predetermined period and to compare a numerical size between said number of low levels and number of high levels for judgment to set a polarity of said device selection bit data which becomes invalid data based on a result of the judgment.

7. The video signal processing circuit according to claim 6, wherein said invalid bit polarity unit comprises a transmission mode judging device to judge, in every predetermined period, whether said video signal processing circuit is in a transmission mode or in a receiving mode, based on the transmitting/receiving demand, a counting device to count said number of low and high levels of said data received from said slave-side device when said transmission mode is judged by said transmission mode judging device to be the receiving mode, and an invalid bit polarity determining unit to compare a numerical size between said number of low and high levels of said data counted by said counting device is compared for judgment in every predetermined period and to determine a polarity of said invalid bit based on the result of the judgment.

8. The video signal processing unit according to claim 7, wherein said invalid bit polarity determining unit is configured to determine a polarity of said invalid bit to be high level when said number of high levels is more than half of a total number and to determine a polarity of said invalid bit to be low level when said number of low levels is more than half of the total number.

9. The video signal processing unit according to claim 8, wherein said invalid bit polarity determining unit is configured to determine said invalid bit to be low level when said number of high level is same as that of low level.

10. A video signal processing circuit for performing predetermined signal processing on an input video signal to transmit an output video signal in a form of a specified transmission format through a video signal line, which is configured as a master-side device to which a slave-side device having a plurality of data storing devices and an address is connected through said video signal line and which outputs said address and a signal demanding transmitting/receiving operations, in every determined period, to said slave-side device and transmits said output video signal or receives data from said slave-side device and also outputs device selection bit data for selection of each of said data storing devices of said slave-side device at time of transmitting mode and which comprises an invalid bit polarity setting unit to set a polarity of said device selection bit data which becomes an invalid bit at time of receiving mode during which each of said data storing devices of said slave-side devices is not selected, to be same as a polarity of one valid data bit before valid data bit in terms of time series.

11. A video signal processing method for performing predetermined signal processing on an input video signal to transmit an output video signal in a form of a specified transmission format through a video signal line comprising:

invalid bit polarity setting processing to be performed by an invalid bit polarity setting unit, wherein, when there exists an invalid bit having no data corresponding to data making up said input video signal in the specified transmission format of said output video signal, to count a number of low and high levels of gray-level data of said input video signal, to compare a numerical size between said number of low levels and said number of high levels for judgment, and to set a polarity of said invalid bit based on a result of the judgment.

12. The video signal processing method according to claim 11, wherein, in said invalid bit polarity setting processing, an input video signal judging unit performs an input video signal judging process of counting said number of low levels and high levels of gray-level data of said input video signal and comparing a numerical size between said number of low levels and high levels for judgment and outputting a result of the judgment and an invalid bit polarity determining unit performs an invalid bit polarity determining process of determining a polarity of said invalid bit based on the result of the judgment obtained by said input video signal judging unit.

13. A video signal processing method to be used in a circuit performing predetermined signal processing on an input video signal to transmit an output video signal in a form of a specified transmission format through a video signal line, comprising:

invalid bit polarity setting processing to be performed by an invalid bit polarity setting unit, when there exists an invalid bit having no data corresponding to data making up said input video signal in the specified transmission format of said output video signal, to set a polarity of said invalid bit existing in the specified transmission format of said output video signal having said invalid bit to be same as a polarity of one valid data bit before valid data bit in terms of time series.

14. A video signal processing method to be used in a video signal processing circuit for performing predetermined signal processing on an input video signal to transmit an output video signal in a form of a specified transmission format through a video signal line, wherein said video signal processing circuit is configured as a master-side device to which a slave-side device having a plurality of data storing devices and an address is connected through said video signal line and which outputs said address and a signal demanding transmitting/receiving operations, in every determined period, to said slave-side device and transmits said output video signal or receives data from said slave-side device and outputs device selection bit data for selection of each of said data storing devices of said slave-side device at time of transmitting mode and wherein an invalid bit polarity setting unit performs an invalid bit polarity setting process of counting a number of low and high levels received from said slave-side device in every predetermined period to compare a numerical size between said number of low levels and number of high levels for judgment and to set, based on a result of the judgment, a polarity of said device selection bit data which becomes invalid bit at time of receiving mode during which said each of storing devices of said slave-side devices is not selected.

15. The video signal processing method according to claim 14, wherein, in said invalid bit setting processing, a transmission mode judging process is performed by said transmission mode judging unit to judge whether said video signal processing circuit is in a transmitting mode or in a receiving mode based on the demand for transmitting/receiving in every predetermined period and a counting process is performed by said counting unit to count said number of low and high levels of said data received from said slave-side device when said video signal processing circuit is judged to be in said receiving mode and an invalid bit polarity determining process is performed by said invalid bit determining unit to compare a numerical size between said number of low levels and said number of high levels counted by said counting unit for judgment in every predetermined period to determine a polarity of said invalid bit based on a result of the judgment.

16. A video signal processing method to be used in a video signal processing circuit for performing predetermined signal processing on an input video signal to transmit an output video signal in a form of a specified transmission format through a video signal line, wherein said video signal processing circuit is configured as a master-side device to which a slave-side device having a plurality of data storing devices and an address is connected through said video signal line and which outputs said address and a signal demanding transmitting/receiving operations, in every determined period, to said slave-side device and transmits said output video signal or receives data from said slave-side device and outputs device selection bit data for selection of each of said data storing devices of said slave-side device at time of transmitting mode and wherein an invalid bit polarity setting unit performs an invalid bit polarity setting process of setting a polarity of said device selection bit data which becomes invalid data at time of receiving mode during which each of said data storing devices of said slave-side device to be same as a polarity of one valid data bit before valid data bit in terms of time series.

17. An image display device having the video signal processing circuit as defined in claim 1.

18. An image display device having the video signal processing circuit as defined in claim 5.

19. An image display device having the video signal processing circuit as defined in claim 6.

20. An image display device having the video signal processing circuit as defined in claim 10.

* * * * *